(12) United States Patent
Kumar et al.

(10) Patent No.: US 9,301,375 B2
(45) Date of Patent: *Mar. 29, 2016

(54) MULTIPLE STRIKE BALLAST WITH LAMP PROTECTION FOR ELECTRODELESS LAMP

(71) Applicant: OSRAM SYLVANIA Inc., Danvers, MA (US)

(72) Inventors: Nitin Kumar, Burlington, MA (US); Markus Ziegler, Watertown, MA (US); Shashank Bakre, Burlington, MA (US); Ayan Choudhury, Danvers, MA (US)

(73) Assignee: OSRAM SYLVANIA INC., Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,837

(22) Filed: Oct. 28, 2013

(65) Prior Publication Data

US 2014/0049159 A1 Feb. 20, 2014

Related U.S. Application Data

(63) Continuation-in-part of application No. 13/460,438, filed on Apr. 30, 2012, now Pat. No. 8,587,208, which is a continuation-in-part of application No. 13/302,075, filed on Nov. 22, 2011, now Pat. No. 8,569,966.

(60) Provisional application No. 61/481,018, filed on Apr. 29, 2011.

(51) Int. Cl.
H05B 37/02 (2006.01)
H05B 41/16 (2006.01)
(Continued)

(52) U.S. Cl.
CPC .............. *H05B 41/16* (2013.01); *H01J 65/048* (2013.01); *H05B 41/2806* (2013.01); *Y02B 20/22* (2013.01)

(58) Field of Classification Search
None
See application file for complete search history.

(56) References Cited

U.S. PATENT DOCUMENTS 6,023,037 A 2/2000 Church et al.
6,177,645 B1 1/2001 Church et al.
(Continued)

FOREIGN PATENT DOCUMENTS

JP 11-503266 A 3/1999

OTHER PUBLICATIONS

Chang Rag Choi, International Search Report and Written Opinion of the International Searching Authority for PCT/US12/35868, Nov. 5, 2012, pp. 1-7, Korean Intellectual Property Office, Daejeon Metropolitan City, Republic of Korea.

*Primary Examiner* — Jany Richardson
(74) *Attorney, Agent, or Firm* — Shauna P. Montana

(57) ABSTRACT

A multi-strike ballast to ignite an electrodeless lamp is disclosed, and includes an inverter circuit, a protection circuit, and a controller. The inverter circuit, upon activation, sends an ignition pulse to the lamp. The inverter circuit shuts down upon receiving a deactivation signal, and activates upon receiving an activation signal, triggering another ignition pulse. The protection circuit senses a change in a voltage associated with the lamp. The sensed changed may indicate that the lamp has not yet ignited or that the lamp is broken. The controller receives the sensed change in voltage and, in response, sends a deactivation signal to the inverter circuit. The controller waits a predetermined time and then sends an activation signal to the inverter circuit. The controller repeats until a change in voltage associated with the lamp is not sensed, or until a predefined number of repeats occur, providing multiple ignition pulses to the lamp.

8 Claims, 10 Drawing Sheets

(51) Int. Cl.
*H05B 41/28* (2006.01)
*H01J 65/04* (2006.01)

(56) References Cited

U.S. PATENT DOCUMENTS

| | | |
|---|---|---|
| 6,181,083 B1 | 1/2001 | Moisin |
| 7,015,652 B2 | 3/2006 | Shi |
| 7,315,130 B1 | 1/2008 | Chen et al. |
| 7,323,827 B2 | 1/2008 | Nerone |
| 7,378,806 B2 | 5/2008 | Nerone |
| 8,018,173 B2 | 9/2011 | Shackle et al. |
| 8,274,239 B2 | 9/2012 | Felty |
| 8,362,701 B2 | 1/2013 | Yao et al. |
| 8,569,966 B2 | 10/2013 | Kumar et al. |
| 8,587,208 B2 | 11/2013 | Kumar et al. |
| 2003/0062849 A1 | 4/2003 | Prasad et al. |
| 2003/0117084 A1 | 6/2003 | Stack |
| 2005/0093477 A1 | 5/2005 | Shi |
| 2006/0097665 A1 | 5/2006 | Haruna et al. |
| 2007/0164684 A1 | 7/2007 | Blair et al. |
| 2008/0054816 A1 | 3/2008 | Shackle |
| 2008/0278085 A1 | 11/2008 | Yu et al. |
| 2010/0194305 A1 | 8/2010 | Makimura et al. |
| 2011/0304279 A1 | 12/2011 | Felty |
| 2012/0001556 A1 | 1/2012 | Newman, Jr. et al. |
| 2012/0043899 A1 | 2/2012 | Veskovic |
| 2012/0313538 A1 | 12/2012 | Kumar et al. |

MULTIPLE STRIKE BALLAST WITH LAMP PROTECTION FOR ELECTRODELESS LAMP

CROSS-REFERENCE TO RELATED APPLICATIONS

The present application is a continuation-in-part of U.S. patent application Ser. No. 13/460,438, filed Apr. 30, 2012 and entitled "MULTIPLE STRIKE BALLAST FOR ELECTRODELESS LAMP", now U.S. Pat. No. 8,587,208, which claims priority of U.S. Provisional Application No. 61/481,018, filed Apr. 29, 2011 and entitled "MULTIPLE STRIKE BALLAST FOR ELECTRODELESS LAMP", and is a continuation-in-part of U.S. patent application Ser. No. 13/302,075, filed Nov. 22, 2011 and entitled "STARTING CIRCUIT FOR BUCK CONVERTER", now U.S. Pat. No. 8,569,966, the entire contents of all three of which are hereby incorporated by reference.

TECHNICAL FIELD

The present invention relates to lighting, and more specifically, to electronic ballasts that power low pressure discharge lamps.

BACKGROUND

A ballast converts alternating current (AC) power from an AC power supply so that it is suitable for energizing a lamp connected to the ballast. A ballast may include a rectifier for generating a direct current (DC) signal from the AC power received from the AC power supply, a buck converter for stepping down the DC signal generated by the rectifier, and an inverter for converting the stepped down DC signal to an oscillating voltage for providing to the lamp.

An electrodeless gas discharge lamp system includes an inductively coupled electrodeless fluorescent lamp and a high frequency ballast. Electrodeless gas discharge lamp systems use electromagnetic induction, instead of electrodes, to spark a discharge to ignite the plasma within the lamp, causing the lamp to emit light. Electrodes found in a typical fluorescent lamp can limit the life of the lamp. Since the electrodeless gas discharge lamps do not include electrodes, the electrodeless gas discharge lamps provide many of the same benefits as fluorescent lamps with electrodes, while additionally providing a longer lamp life.

Multiple electrodeless gas discharge lamps are commonly used to illuminate a single location. A single high frequency ballast is typically used to power each electrodeless gas discharge lamp, by providing an ignition strike to ignite the plasma within the lamp.

SUMMARY

A typical electrodeless lamp ballast provides only a single ignition strike to the electrodeless lamp. If the single ignition strike fails to ignite the lamp, the ballast shuts down. More particularly, in a typical ICETRON® ballast made by OSRAM SYLVANIA Inc., the ballast will shut off the self resonating inverter that generates the ignition strike. A further ignition strike is generated only if the power to the ballast is switched off, and then back on. However, electrodeless lamps are typically used in applications where it is inconvenient at best, and almost impossible at worst, to repeatedly switch power to the ballast off and on again. Such applications include, but are not limited to, street lighting applications, tunnel lighting applications, and the like.

A further complication to using only a single strike to ignite an electrodeless lamp is that it is hard to start an electrodeless lamp in a dark environment (i.e., one with little or no other light). An electrodeless lamp, as is well known in the art, requires photons and free electrons to initiate the discharge, causing the lamp to ignite. Only free electrons (and ions) can be acted upon by the electric field within the lamp. Free electrons are constantly created by cosmic rays and the Earth's natural radiation. This process is highly random and the equilibrium between free electron creation and losses due to recombination and to the walls of the lamp leaves few free electrons. Free electrons are also created by photoemission of the phosphor. This process creates more free electrons. Therefore, a lamp in the presence of light, which can rely on cosmic radiation and photoemission to create free electrons, will start more easily than a lamp in a dark environment, which can only rely on the randomness of cosmic radiation.

Further, should an electrodeless lamp break during normal operation, it is generally preferable to shut the ballast off, as this avoids placing undue stress on the components of the ballast. When an electrodeless lamp breaks, the load to the inverter is the non-broken inductive coil(s) of the broken lamp. Such a load shifts the resonant curve of a typical ballast operating an unbroken electrodeless lamp, meaning that high voltage(s) and current(s) may appear in the circuitry of the inverter, which may travel to other components and may damage those components.

Embodiments described herein provide for a ballast that provides an electrodeless lamp with multiple ignition strikes, until the lamp ignites, or until the lamp breaks, without a user having to toggle input power to the ballast, while also providing protection to the ballast should the lamp break.

If a first ignition strike of the electrodeless lamp by its ballast fails to ignite the lamp, an excess of free electrons and ions created in part by the failed ignition strike should help to make a successive ignition strike successful. The more failed strikes, the greater the amount of excess free electrons and ions to assist later ignition strikes, and the more likely a successive strike will ignite the lamp. In situations where an electrodeless lamp has failed (i.e., is broken), it is advisable to turn the ballast off to avoid stress on the components of the ballast. When the lamp is broken, the load to the inverter is only the coils of the lamp, which shifts the resonance curve, resulting in high voltages and currents in the inverter circuit. This may cause damage to the inverter circuit and to other components of the ballast.

There is generally a lag time between the time the ballast first receives power from the AC power supply and the time that the inverter begins oscillating and thereby igniting and powering (i.e., energizing) the lamp. During this lag time, the inverter does not function as a load to the buck converter and the voltage generated by the buck converter falls. As a result, a threshold voltage for starting the inverter may never be generated, and thus the ballast would fail to ignite and power the lamp. Accordingly, there is a need for ballast that ensures a reliable start up for the lamp.

Embodiments of the present invention provide a ballast that reliably energizes a lamp connected to the ballast. In one embodiment, the ballast includes a buck converter for generating a direct current (DC) buck voltage signal having a particular peak DC buck voltage value. An inverter is connected to buck converter circuit for receiving a start up signal and, in response to receiving the start up signal, generating an oscillating voltage signal for energizing the lamp. A switching component, such as a diode for alternating current (DIAC), is connected between the buck converter and the inverter for providing the start up signal to the inverter. The switching component has a predetermined breakover voltage value. When the voltage at the switching component increases to the predetermined breakover voltage value, the switching component is configured to conduct a start up signal to the inverter. The ballast operates in a startup mode during a time period that begins when the ballast initially receives power and ends at the time that the voltage at the switching component reaches the predetermined breakover voltage.

During the start up mode, the sensing circuit senses the voltage at the switching component. A control circuit is connected to the buck converter and the sensing circuit for driving the buck converter. The control circuit is configured to monitor the sensed voltage from the sensing circuit while the voltage at the switching component increases to the predetermined breakover voltage. When the sensed voltage reaches a predetermined voltage that is less than the breakover voltage of the switching component, the control circuit is configured to drive to buck converter to generate a voltage pulse having the particular peak DC buck voltage value. Since the DC buck voltage signal drops during the startup mode, at a point in time during the start up mode aspects of the invention pump the DC buck voltage signal back to its peak value so that the voltage at the switching component will reach the predetermined breakover voltage and the inverter will be activated.

In an embodiment, there is provided a multi-strike ballast to ignite an electrodeless lamp. The multi-strike ballast includes: an inverter circuit configured to send an ignition pulse to the electrodeless lamp following activation of the inverter circuit, to shut down upon receiving a deactivation signal, and to activate upon receiving an activation signal; an output voltage detection circuit configured to detect an output voltage across the electrodeless lamp; and an inverter shutdown circuit, wherein the inverter shutdown circuit includes a multi-strike diac, and wherein the inverter shutdown circuit is configured to receive the output voltage from the output voltage detection circuit, to break the multi-strike diac upon the output voltage reaching a predetermined level and in response to send a deactivation signal to the inverter circuit, and to turn off the multi-strike diac upon the output voltage falling below the predetermined level and in response to send an activation signal to the inverter circuit.

In a related embodiment, the inverter circuit may include a switch, wherein the switch may be configured to control activation and deactivation of the inverter circuit and the ignition pulses sent thereby, wherein the multi-strike diac may include a first terminal and a second terminal, and wherein the inverter shutdown circuit may further include: an RC circuit connected to the first terminal of the multi-strike diac; a resistive divider circuit connected to the second terminal of the multi-strike diac; a multi-strike capacitor connected to the resistive divider and configured to charge upon the breaking of the multi-strike diac and to discharge upon the turning off of the multi-strike diac; and a multi-strike switch connected to the multi-strike capacitor and to the switch of the inverter circuit, wherein the multi-strike switch maybe configured to turn on in response to the charging of the multi-strike capacitor to a threshold voltage and in response to short the switch of the inverter circuit, thereby deactivating the inverter circuit, and may be configured to turn off in response to the discharging of the multi-strike capacitor below the threshold voltage and in response to un-short the switch of the inverter circuit, thereby activating the inverter circuit. In a further related embodiment, the RC circuit may include a detection capacitor configured to receive the detected output voltage of the electrodeless lamp and to charge to the predetermined level, wherein the detection capacitor may be connected to the first terminal of the multi-strike diac. In another further related embodiment, the switch of the inverter may be a transistor, the transistor may include a gate, a source, and a drain, and the multi-strike switch may be configured to turn on in response to the charging of the multi-strike capacitor to the threshold voltage and in response to connect the gate of the transistor of the inverter circuit with the source of the transistor of the inverter circuit, thereby deactivating the inverter circuit, and may be configured to turn off in response to the discharging of the multi-strike capacitor below the threshold voltage and in response to disconnect the gate of the transistor of the inverter circuit with the source of the transistor of the inverter circuit, thereby activating the inverter circuit.

In yet another related embodiment, the output voltage detection circuit and the inverter shutdown circuit may together form a multiple ignition strike circuit.

In still another related embodiment, the output voltage detection circuit may include: a feedback capacitor connected to a first terminal of the electrodeless lamp; a first diode and a second diode in series, wherein the first diode and the second diode are in series with the feedback capacitor; a capacitor in series with a third diode; a feedback resistor in parallel with the capacitor and the third diode; and a fourth diode, wherein an anode of the fourth diode is connected between the capacitor and a cathode of the third diode. In a further related embodiment, the inverter circuit may include a switch, wherein the switch is configured to control activation and deactivation of the inverter circuit and the ignition pulses sent thereby, wherein the multi-strike diac may include a first terminal and a second terminal, and wherein the inverter shutdown circuit may further include: an RC circuit connected to the first terminal of the multi-strike diac; a resistive divider circuit connected to the second terminal of the multi-strike diac; a multi-strike capacitor connected to the resistive divider and configured to charge upon the breaking of the multi-strike diac and to discharge upon the turning off of the multi-strike diac; and a multi-strike switch connected to the multi-strike capacitor and to the switch of the inverter circuit, wherein the multi-strike switch may be configured to turn on in response to the charging of the multi-strike capacitor to a threshold voltage and in response to short the switch of the inverter circuit, thereby deactivating the inverter circuit, and may be configured to turn off in response to the discharging of the multi-strike capacitor below the threshold voltage and in response to un-short the switch of the inverter circuit, thereby activating the inverter circuit.

In another embodiment, there is provided a method of igniting an electrodeless lamp. The method includes: detecting a first output voltage of the electrodeless lamp, the electrodeless lamp having received a first ignition pulse from an activated inverter circuit; breaking a multi-strike diac upon the detected first output voltage reaching a predetermined level; deactivating the inverter circuit upon the multi-strike diac breaking; detecting a second output voltage of the electrodeless lamp; turning off the multi-strike diac upon the detected second output voltage falling below the predetermined level; reactivating the inverter circuit upon the multi-strike diac turning off; and sending a second ignition pulse to the electrodeless lamp.

In a related embodiment, the method may further include repeating the steps of detecting, breaking, deactivating, detecting, turning off, reactivating, and sending, until the electrodeless lamp ignites.

In another related embodiment, detecting a first output voltage may include: detecting a first output voltage of the electrodeless lamp, the electrodeless lamp having received a first ignition pulse from an activated inverter circuit; and providing the detected first output voltage to charge a detection capacitor to the predetermined level, wherein the detection capacitor is connected to the multi-strike diac such that the multi-strike diac is also provided the detected first output voltage. In a further related embodiment, the method may further include: delaying breaking the multi-strike diac by an RC circuit, wherein the RC circuit comprises the detection capacitor and an a resistor.

In still another related embodiment, deactivating may include: charging a multi-strike capacitor to a gate threshold voltage; in response, turning on a multi-strike switch; and shorting a switch of the inverter such that the inverter is deactivated. In a further related embodiment, shorting may include: connecting a gate of the switch of the inverter with a source of the switch of the inverter.

In an embodiment, there is provided a ballast. The ballast includes: a rectifier that receives an alternating current (AC) voltage signal from an AC power supply and produces a rectified voltage signal therefrom; a power factor correction circuit connected to the rectifier to provide a corrected voltage signal as a function of the rectified voltage signal; a buck converter connected to the power factor correction circuit to step down the corrected voltage signal, the buck converter comprising: an input terminal connected to the power factor correction circuit to receive the corrected voltage signal; an output terminal to provide the stepped down voltage signal; a transistor having a drain terminal, a gate terminal, and a source terminal, wherein the drain terminal is connected to the input terminal; a capacitor having a first terminal connected to the output terminal and having a second terminal connected to ground potential; a diode having an anode connected to ground potential and having a cathode connected to the source terminal of the transistor; and an inductor having a first terminal connected to the source terminal of the transistor and to the cathode of the diode, and having a second terminal connected to the first terminal of the capacitor; an inverter connected to the output terminal of the buck converter circuit to receive a start up signal and, in response, to generate an oscillating voltage signal to energize the lamp; a switching component connected between the output terminal of the buck converter circuit and the inverter to provide the start up signal to the inverter, the switching component having a predetermined breakover voltage value, wherein the switching component is configured to provide the start up signal to the inverter when a voltage at the switching component increases to the predetermined breakover voltage value; a sensing circuit configured to sense the voltage at the switching component; and a control circuit connected to the buck converter and to the sensing circuit to drive the buck converter, the control circuit configured to monitor the sensed voltage from the sensing circuit while the voltage at the switching component increases to the predetermined breakover voltage and to generate a gate drive pulse at the gate terminal of the transistor when the sensed voltage reaches a predetermined voltage that is less than the breakover voltage of the switching component.

In a related embodiment, the buck converter may further include a bootstrapping capacitor connected to the source terminal of the transistor, wherein the bootstrapping capacitor may be charged in response to the gate drive pulse generated at the gate terminal of the transistor when the sensed voltage reaches the predetermine voltage. In a further related embodiment, the buck converter may further include a bootstrapping resistor and a bootstrapping diode connected together in series, wherein a first terminal of the bootstrapping capacitor may be connected to the series connected bootstrapping resistor and bootstrapping diode, and a second terminal of the bootstrapping capacitor may be connected to the source terminal of the transistor. In a further related embodiment, the ballast may further include an internal power supply, and the bootstrapping diode may have an anode connected to the internal power supply and a cathode connected to the bootstrapping resistor.

In another related embodiment, the buck converter may further include: a bias resistor; and a bootstrapping capacitor; wherein the bias resistor may have a first terminal connected to the input terminal of the buck converter and a second terminal connected to a first terminal of the bootstrapping capacitor, and wherein a second terminal of the bootstrapping capacitor may be connected to the source terminal of the transistor.

In yet another related embodiment, the switching component may be a diode for alternating current (DIAC). In still another related embodiment, the predetermined breakover voltage may be about 32 Volts.

In yet still another related embodiment, the sensing circuit may include: a first sensing resistor and a second sensing resistor connected together in series; and a sensing capacitor; wherein the series connected first and second sensing resistors may be connected between the switching component and the ground potential, and wherein the sensing capacitor may be connected in parallel with the series connected first and second sensing resistors. In a further related embodiment, the first and second sensing resistor and the sensing capacitor may define a time constant, and wherein the voltage at the switching component may increase to the breakover voltage over a period of time, and the period of time may be a function of the time constant. In another further related embodiment, the second sensing resistor may have a first terminal connected to the first sensing resistor and a second terminal connected to ground potential, and wherein the control circuit may be connected to the sensing circuit at the first terminal of the second sensing resistor, and the sensed voltage may be the voltage across the second resistor.

In another embodiment, there is provided a ballast. The ballast includes: a buck converter to generate a direct current (DC) buck voltage output, the buck converter having a particular peak DC buck voltage value associated therewith; an inverter connected to buck converter circuit to receive a start up signal and, in response, to generate an oscillating voltage signal to energize a lamp; a switching component connected between the buck converter and the inverter to provide the start up signal to the inverter, the switching component having a predetermined breakover voltage value, wherein the switching component is configured to provide the start up signal to the inverter when voltage at the switching component increases to the predetermined breakover voltage value; a sensing circuit configured to sense the voltage at the switching component; and a control circuit connected to the buck converter and the sensing circuit to drive the buck converter, the control circuit configured to monitor the sensed voltage from the sensing circuit while the voltage at the switching component increases to the predetermined breakover voltage and to drive the buck converter to generate a voltage pulse having the particular peak DC buck voltage value when the sensed voltage reaches a predetermined voltage that is less than the breakover voltage of the switching component.

In a related embodiment, the buck converter may include a bootstrapping capacitor configured to charge responsive to the voltage pulse generated by the buck converter when the sensed voltage reaches the predetermined voltage. In another related embodiment, the sensing circuit may include: a first sensing resistor and a second sensing resistor connected together in series; and a sensing capacitor; wherein the series connected first and second sensing resistors may be connected between the switching component and ground potential, and wherein the sensing capacitor may be connected in parallel with the series connected first and second sensing resistors. In a further related embodiment, the first and second sensing resistor and the sensing capacitor may define a time constant, and wherein the voltage at the switching component may increase to the breakover voltage over a period of time, and the period of time may be a function of the time constant. In another further related embodiment, the second sensing resistor may have a first terminal connected to the first sensing resistor and a second terminal connected to ground potential, and wherein the control circuit may be connected to the sensing circuit at the first terminal of the second sensing resistor, and the sensed voltage may be the voltage across the second resistor.

In yet another related embodiment, the control circuit may be configured to drive the buck converter in a normal operation mode subsequent to the voltage at the switching component increasing to the predetermined breakover voltage value, wherein during the normal operation mode, the control circuit may drive the buck converter to operate at a particular duty cycle. In a further related embodiment, the particular duty cycle may correspond to a selected lighting level for the lamp. In another further related embodiment, the control circuit may be further configured to vary the particular duty cycle in order to vary a lighting level generated by the lamp.

In another embodiment, there is provided a ballast. The ballast includes: a rectifier to receive an alternating current (AC) voltage signal from an AC power supply and to produce a rectified voltage signal therefrom; a power factor correction circuit connected to the rectifier to provide a corrected voltage signal as a function of the rectified voltage signal; a buck converter to generate a direct current (DC) buck voltage output as a function of the corrected voltage signal, the buck converter having a particular peak DC buck voltage value associated therewith; an inverter connected to the buck converter to receive a start up signal and, in response, to generate an oscillating voltage signal to energize a lamp; a switching component connected between the buck converter and the inverter to provide the start up signal to the inverter, the switching component having a predetermined breakover voltage value, wherein the switching component is configured to provide the start up signal to the inverter when voltage at the switch component increases to the predetermined breakover voltage value; a sensing circuit configured to sense the voltage at the switching component; and a control circuit connected to the buck converter and the sensing circuit to drive the buck converter, the control circuit configured to monitor the sensed voltage from the sensing circuit while the voltage at the switching component increases to the predetermined breakover voltage and to drive the buck converter to generate a voltage pulse having the particular peak DC buck voltage value when the sensed voltage reaches a predetermined voltage that is less than the breakover voltage of the switching component.

In a related embodiment, the buck converter may include a bootstrapping capacitor configured to charge responsive to the voltage pulse generated by the buck converter when the sensed voltage reaches the predetermined voltage.

In another embodiment, there is provided a multi-strike ballast to ignite an electrodeless lamp. The multi-strike ballast includes: an inverter circuit configured to send an ignition pulse to the electrodeless lamp following activation of the inverter circuit, to shut down upon receiving a deactivation signal, and to activate upon receiving an activation signal; a protection circuit configured to sense a change in voltage associated with the electrodeless lamp; and a controller, wherein the controller is configured to receive the sensed change in voltage associated with the electrodeless lamp from the protection circuit and in response to send a deactivation signal to the inverter circuit, to wait a predetermined time, following the predetermined time to send an activation signal to the inverter circuit, and to repeat until the protection circuit does not sense a change in voltage associated with the electrodeless lamp or until a predefined number of repeats occur.

In a related embodiment, the multi-strike ballast may further include: a buck converter, wherein the buck converter may be configured to receive the activation signal and the deactivation signal from the controller, such that the buck converter controls activation and shut down of the inverter circuit based on the signal received from the controller. In another related embodiment, the protection circuit may include: a first zener diode and a second zener diode, each including an anode and a cathode, wherein the cathode of the first zener diode may be connected to the cathode of the second zener diode, and wherein the anode of the first zener diode may be connected to the inverter circuit; a capacitor connected to a cathode of a first rectifier diode; a resistor connected in parallel with the capacitor and the first rectifier diode; a first resistor connected in a series to a second resistor, wherein the second resistor may be connected in series to a second rectifier diode, wherein the series connected first resistor, second resistor, and second rectifier diode may be in parallel with the first rectifier diode; and a filter capacitor in parallel with the first resistor. In a further related embodiment, the protection circuit may be connected to the controller at a connection point between the first resistor and the second resistor. In a further related embodiment, the controller may include an ADC DEGAS pin, and the protection circuit may be connected to the controller at the ADC DEGAS pin.

In still another related embodiment, the protection circuit may be configured to sense a change in voltage associated with the electrodeless lamp, wherein the change in voltage may be due to a broken electrodeless lamp or an electrodeless lamp that has not yet ignited.

In another embodiment, there is provided a method of igniting an electrodeless lamp. The method includes: sensing a change in voltage associated with the electrodeless lamp, the electrodeless lamp having received a first ignition pulse from an activated inverter circuit; receiving the sensed change in voltage; in response, deactivating the inverter circuit; waiting a predetermined time; in response, reactivating the inverter circuit; and sending a second ignition pulse to the electrodeless lamp.

In a related embodiment, the method may further include repeating the steps of sensing, receiving, deactivating, waiting, reactivating, and sending, until the electrodeless lamp ignites. In another related embodiment, the method may further include repeating the steps of sensing, receiving, deactivating, waiting, reactivating, and sending, until a predetermined number of repeats occurs.

In still another related embodiment, sensing may be performed by a protection circuit, wherein the protection circuit may include: a first zener diode and a second zener diode, each including an anode and a cathode, wherein the cathode of the first zener diode may be connected to the cathode of the second zener diode, and wherein the anode of the first zener diode may be connected to the inverter circuit; a capacitor connected to a cathode of a first rectifier diode; a resistor connected in parallel with the capacitor and the first rectifier diode; a first resistor connected in a series to a second resistor, wherein the second resistor may be connected in series to a second rectifier diode, wherein the series connected first resistor, second resistor, and second rectifier diode may be in parallel with the first rectifier diode; and a filter capacitor in parallel with the first resistor.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Figure 1:
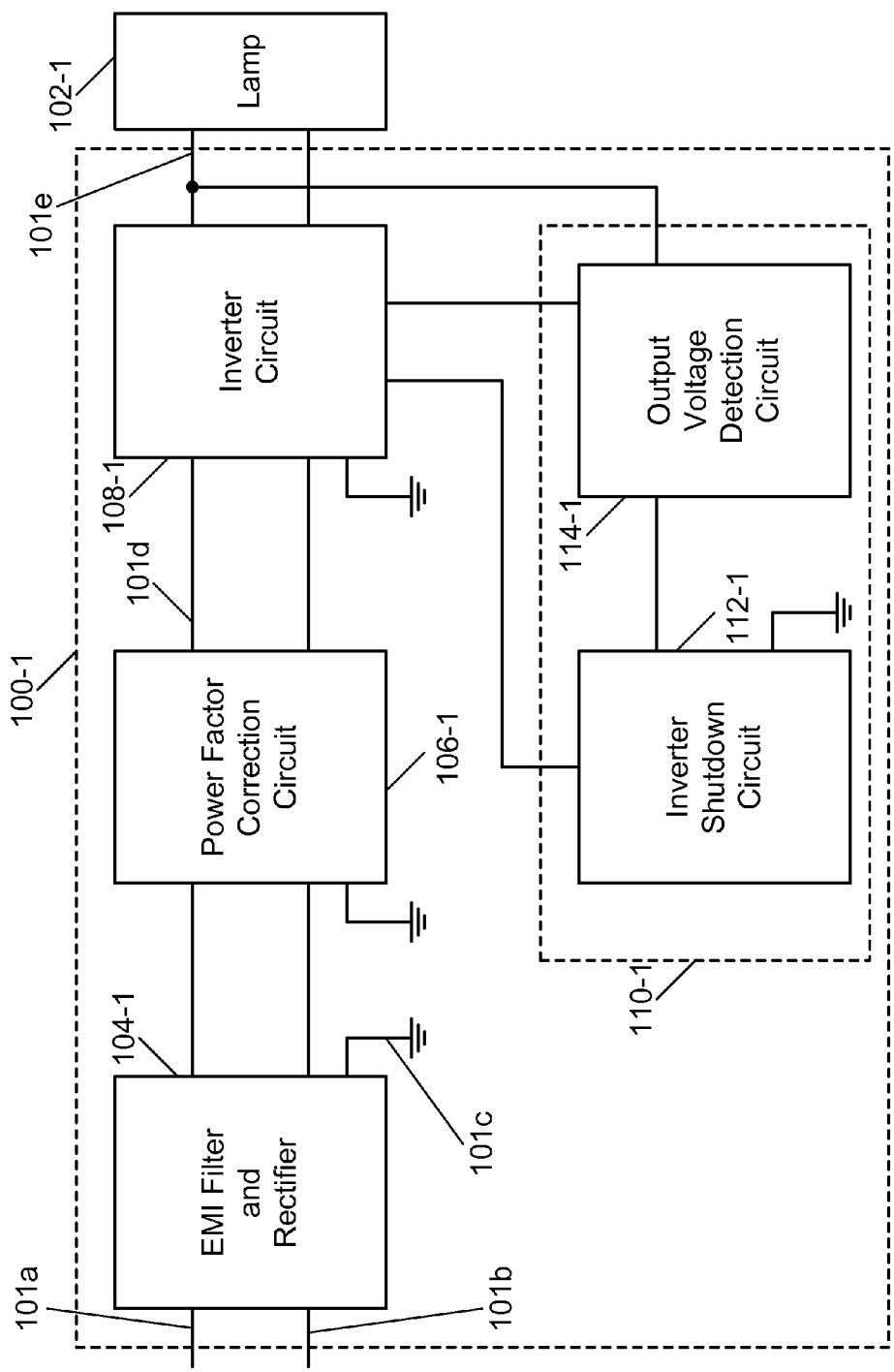
FIG. 1 shows a block diagram of a multi-strike ballast according to embodiments disclosed herein.

FIG. 1 shows a block diagram of a multi-strike ballast 100-1. The multi-strike ballast 100-1 is used to operate an electrodeless lamp 102-1, such as but not limited to an ICE-TRON® lamp made by OSRAM SYLVANIA Inc. Though embodiments may be described herein with reference to a single electrodeless lamp, of course multiple electrodeless lamps may also be operated. Further, though embodiments may be described herein with reference to a particular ballast, namely a 40W ICETRON® ballast made by OSRAM SYLVANIA Inc., embodiments are not so limited and may be applied to any type of electrodeless lamp ballast operating any type of electrodeless lamp(s).

The multi-strike ballast 100-1 shown in FIG. 1 includes a high voltage input terminal (i.e., line voltage input terminal) 101a adapted to be connected to an alternating current (AC) power supply (e.g., standard 120V AC mainline power) (not shown in FIG. 1). The multi-strike ballast 101 also includes a neutral input terminal 101b and a ground terminal 101c connectable to ground potential. An input AC power signal is received by the multi-strike ballast 100-1 from the AC power supply via the high voltage input terminal 101a. The multi-strike ballast 100-1 also includes an electromagnetic interference (EMI) filter and rectifier (e.g., full-wave rectifier) 104-1, which are illustrated together in FIG. 1. The EMI filter portion of the EMI filter and rectifier 104-1 prevents noise that may be generated by the multi-strike ballast 100-1 from being transmitted back to the AC power supply. The rectifier portion of the EMI filter and rectifier 104-1 converts AC voltage received from the AC power supply to DC (direct current) voltage. Thus, the EMI filter and rectifier 104-1 outputs a DC voltage.

A power factor correction circuit 106-1, which may, in some embodiments, be a boost converter, is connected to the EMI filter and rectifier 104-1. The power factor correction circuit 106-1 receives the rectified DC voltage from the EMI filter and rectifier 104-1 and produces a high DC voltage on a high DC voltage bus 101d. For example, the power factor correction circuit 106-1 may provide a voltage of around 450 volts to the high DC voltage bus 101d. An inverter circuit 108-1 is connected to the power factor correction circuit 106-1 to provide a voltage to operate the electrodeless lamp 102-1, i.e. to ignite the electrodeless lamp 102-1 and ensure continued operation thereof. This voltage provided by the inverter circuit is referred to hereinafter as an output voltage 101e.

The multi-strike ballast 100-1, in some embodiments, also includes a multiple ignition strike circuit 110-1. In some embodiments, the multiple ignition strike circuit 110-1 includes an inverter shutdown circuit 112-1 and an output voltage detection circuit 114-1. In some embodiments, the multiple ignition strike circuit includes only the inverter shutdown circuit 112-1. The output voltage detection circuit 114-1 is connected so as to receive the output voltage 101e that is provided to the electrodeless lamp 102-1 from the inverter circuit 108-1. The output voltage detection circuit is also connected to the inverter circuit 108-1 as described in greater detail with regards to FIG. 2. The output voltage detection circuit 114-1 detects the voltage across the electrodeless lamp 102-1 and provides it to the inverter shutdown circuit 112-1.

The inverter shutdown circuit 112-1 is connected to the output voltage detection circuit 114-1 and the inverter circuit 108-1. As is described in greater detail below, the inverter shutdown circuit 112-1 receives the output voltage 101e as detected by the output voltage detection circuit 114-1. When the output voltage 101e rises above a predetermined level, the inverter shutdown circuit 112-1 sends a deactivation (i.e., shutdown) signal to the inverter circuit 108-1. This causes the inverter circuit 108-1 to cease sending an ignition pulse to the electrodeless lamp 102-1. The voltage across the electrodeless lamp 102-1 (i.e., the output voltage 101e) then falls, and this decrease is detected by the output voltage detection circuit 114-1. The output voltage detection circuit 114-1 sends the detected output voltage 101e to the inverter shutdown circuit 112-1. When the output voltage 101e falls below the predetermined level, the inverter shutdown circuit 112-1 sends an activation (i.e., turn on) signal to the inverter circuit 108-1. The inverter circuit 108-1 then turns on, and, as part of its typical activation process, sends an ignition pulse to the electrodeless lamp 102-1. These operations repeat unless the electrodeless lamp 102-1 ignites, at which point, under normal operation, the output voltage 101e as detected by the output voltage detection circuit 114-1 does not rise to the predetermined level and thus the inverter shutdown circuit 112-1 does not send an activation or deactivation signal, or both, to the inverter circuit 108-1.

Figure 2:
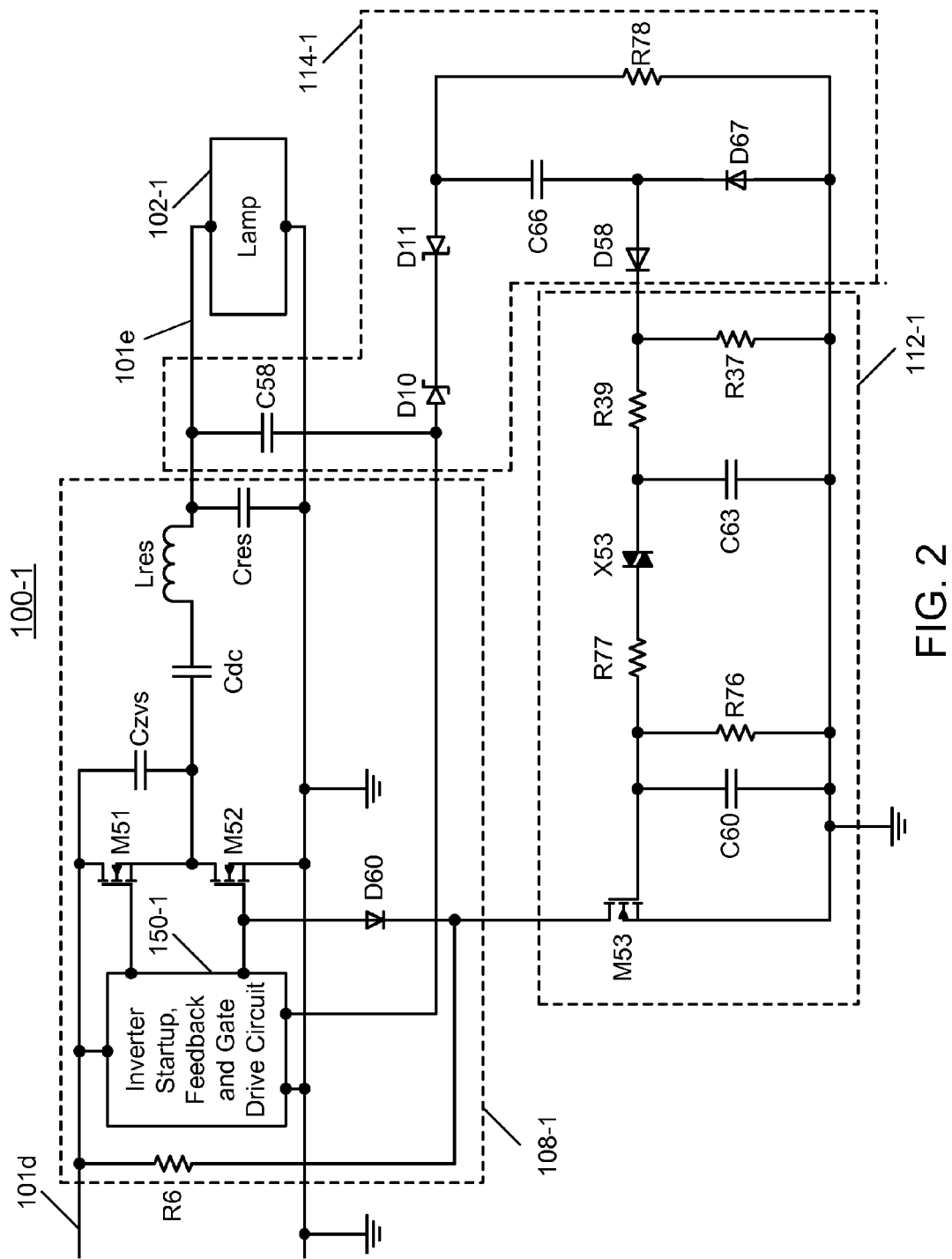
FIG. 2 shows a partial circuit diagram of a multi-strike ballast according to embodiments disclosed herein.

FIG. 2 shows a partial circuit diagram of a multi-strike ballast 100-1, which is in particular a 40W ICETRON® ballast made by OSRAM SYLVANIA Inc. to which a multiple ignition strike circuit 110-1 (comprising an inverter shutdown circuit 112-1 and an output voltage detection circuit 114-1)

has been added. FIG. 2 also shows the electrodeless lamp 102-1 which the multi-strike ballast 100-1 operates, the inverter circuit 108-1, and the high DC voltage bus 101d from the power factor correction circuit 106-1 shown in FIG. 1.

The inverter circuit 108-1 includes a resistor R6, an inverter startup, feedback and gate drive circuit 150-1, an inverter switch M52, a switch M51, a diode D60, a first inverter capacitor Czvs, a DC capacitor Cdc, a resonant inductor Lres, and a resonant capacitor Cres, connected as shown in FIG. 2 in a self-oscillating half bridge configuration, though of course other inverter configurations may be used. The output voltage 101e of the inverter circuit 108-1 is applied to the electrodeless lamp 102-1 and is detected by the output voltage detection circuit 114-1.

The output voltage detection circuit 114-1 includes a feedback capacitor C58, a first diode D10, a second diode D11, a capacitor C66, a third diode D67, a feedback resistor R78, and a fourth diode D58. The feedback capacitor C58 is connected to a first terminal of the electrodeless lamp 102-1. The first diode D10 is in series with the second diode D11, and the series combination thereof is in series with the feedback capacitor C58. A connection point between the feedback capacitor C58 and the series combination of the first diode D10 and the second diode D11 is connected to the inverter circuit 108-1, more specifically, the startup, feedback and gate drive circuit 150-1. The capacitor C66 is in series with the third diode D67. The other terminal of the capacitor C66 is connected to the anode of the second diode D11. The feedback resistor R78 is in parallel with the capacitor C66 and the third diode D67. The anode of the third diode D67 and a terminal of the feedback resistor R78 are connected to a ground potential. An anode of the fourth diode D58 is connected between the capacitor C66 and a cathode of the third diode D67. A cathode of the fourth diode D58 is connected to the inverter shutdown circuit 112-1 as described herein.

In some embodiments, as described above with regards to FIG. 1, the output voltage detection circuit 114-1 is part of the multiple ignition strike circuit 110-1 (shown in FIG. 1). Alternatively, the output voltage detection circuit 114-1 in some embodiments is not part of the multiple ignition strike circuit 110-1 (shown in FIG. 1). Alternatively, in some embodiments, a subset of components of the output voltage detection circuit 114-1 is part of the multiple ignition strike circuit 110-1 (shown in FIG. 1) while the remaining components are not.

The inverter shutdown circuit 112-1 includes, in some embodiments, a multi-strike switch M53, an RC circuit formed of a detection capacitor C63 and a resistor R37 and a resistor R39, a resistive divider circuit formed of a resistor R76 and a resistor R77, a multi-strike capacitor C60, and a multi-strike diac X53. The multi-strike diac X53 includes a first terminal and a second terminal. The RC circuit is connected to the cathode of the fourth diode D58 of the output voltage detection circuit 114-1 and to the first terminal of the multi-strike diac X53. More particularly, the resistor R37 is connected in series with the resistor R39, and the cathode of the fourth diode D58 is connected therebetween, that is, at a connection point joining a terminal of the resistor R37 and a terminal of the resistor R39. The detection capacitor C63 is in parallel across the series combination of the resistor R37 and the resistor R39. The other terminal of the resistor R37 and a terminal of the detection capacitor C63 connected thereto are connected to a ground potential. The other terminal of the detection capacitor C63 is connected to the other terminal of the resistor R39 and the first terminal of the multi-strike diac X53.

The second terminal of the multi-strike diac X53 is connected to the resistive divider circuit formed of the resistor R76 and the resistor R77. More specifically, the resistor R77 is connected between the second terminal of the multi-strike diac X53 and a terminal of the resistor R76. The other terminal of the resistor R76 is connected to a ground potential. A connection point between the resistor R76 and the resistor R77 (i.e., where the resistor R76 is connected to the resistor R77) is connected to the multi-strike capacitor C60. The other terminal of the multi-strike capacitor C60 is connected to a ground potential. In other words, the multi-strike capacitor C60 is in parallel with the resistor R76, as well as the capacitor C63, and the resistor R37, as shown in FIG. 2. The multi-strike switch M53 is connected to the multi-strike capacitor C60, to the inverter circuit 108-1, and to a ground potential. More specifically, the multi-strike switch M53 is an n-channel metal oxide field effect transistor (MOSFET or FET) having a gate, a source, and a drain. The gate of the multi-strike switch M53 is connected to the multi-strike capacitor C60. The drain of the multi-strike switch M53 is connected to the diode D60 of the inverter circuit 108-1, and the source of the multi-strike switch M53 is connected to the ground potential.

In operation, the inverter shutdown circuit 112-1 functions as follows. The output voltage detection circuit 114-1 detects the output voltage 101e across the electrodeless lamp 102-1. In situations when the electrodeless lamp 102-1 fails to ignite from an ignition pulse provided thereto from the inverter circuit 108-1, the output voltage detection circuit 114-1 detects a DC voltage (i.e., the output voltage 101e) that provided to the inverter shutdown circuit 112-1. More specifically, the inverter shutdown circuit 112-1 receives the detected output voltage 101e, which is high enough to charge the detection capacitor C63 of the inverter shutdown circuit 112-1 to a predetermined level. In some embodiments, this predetermined level is 32V and/or substantially 32V. Of course, in other embodiments, the capacitor C63 is selected to provide a different charging voltage maximum (i.e., predetermined level). This causes the multi-strike diac X53 to break. Of course, in other embodiments, the multi-strike diac X53 is selected to break at a different voltage (i.e., predetermined level), in line with the selection of the charging voltage of the capacitor C63 (i.e., predetermined level). The duration until the multi-strike diac X53 breaks is set by an RC time constant determined by the combination of the capacitor C63 and the resistors R37 and R39.

After the multi-strike diac X53 breaks, the multi-strike capacitor C60 is charged through the resistive divider formed of the resistors R76 and R77. When the multi-strike capacitor C60 is charged such that the voltage across the multi-strike capacitor C60 reaches a gate threshold voltage of the multi-strike switch M53, the multi-strike switch M53 turns on. The inverter switch M52 (also referred to herein as a "switch M52 of the inverter circuit 108-1") is also an n-channel MOSFET having a gate, a source, and a drain. When the multi-strike switch M53 turns on, this causes the gate of the inverter switch M52 in the inverter circuit 108-1 to short with its source via a diode D60. The short of the inverter switch M52 results in the shutdown (i.e., deactivation) of the inverter circuit 108-1, which kills (i.e., stops) the oscillations of the inverter circuit 108-1. In other words, the inverter circuit 108-1 ceases providing an operating voltage to the electrodeless lamp 102-1. As this occurs, the output voltage 101e across the electrodeless lamp 102-1 begins to fall. This fall in the output voltage 101e is detected by the output voltage detection circuit 114-1. As the detected output voltage falls below the predetermined level (e.g., 32V and/or substantially 32V), the multi-strike diac X53 turns off. When the diac X53 is turned off, the multi-strike capacitor C60 discharges and has a voltage below the threshold voltage level, and thus the corresponding gate voltage of the multi-strike switch M53 also falls below the threshold voltage level, turning off the multi-strike switch M53. This causes the inverter circuit 108-1 to activate (i.e., reactive, start), as the gate of the inverter switch M52 is no longer shorted to its source via the multi-strike switch M53 in its on state via the diode D60. As the inverter circuit 108-1 activates, it sends out an ignition pulse to the electrodeless lamp 102-1, as part of its usual startup operation. The above-described process repeats until the lamp is ignited, causing the lamp to (if necessary) receive multiple strikes from the inverter circuit 108-1 due to the multiple stops and (re-)starts (i.e., deactivations and (re-) activations) of the inverter circuit 108-1.

After the electrodeless lamp 102-1 is ignited, under normal operation, the output voltage 101e as detected by the output voltage detection circuit 114-1 is never high enough to break the multi-strike diac X53 (i.e., turn it on), and hence the multi-strike switch M53 always stays off with a DC voltage (i.e., a high DC bus voltage 101d) across it via a resistor R6 in the multi-strike ballast 100-1.

Note that, in a situation involving an electrodeless lamp that is broken, as opposed to an electrodeless lamp that requires more than one ignition strike to start, an electrodeless lamp ballast including a multiple strike ignition circuit as described herein where never stop sending ignition pulses to the electrodeless lamp. As the electrodeless lamp cannot be ignited, the voltage across the electrodeless lamp will never reach a state such that the multiple strike ignition circuit stops ceases operation (i.e., the multi-strike diac does not break). In other words, in embodiments described herein, except for failure of one or more components, it is only lamp ignition that triggers the cessation of further ignition strikes being sent to the electrodeless lamp. Further note that, in case of an electrodeless lamp in a dark environment, ignition may be, and sometimes is, achieved after many ignition strikes.

In some embodiments, the functionality of the output voltage detection circuit shown in FIGS. 1 and 2 is performed by a microcontroller that is part of the multi-strike ballast. The microcontroller operates based on software instructions, whether stored in a memory within the microcontroller or external to the microcontroller and/or ballast and otherwise connected thereto (e.g., via a network). In such embodiments, the microcontroller is capable of sensing the output voltage across the electrodeless lamp. In such embodiments, the microcontroller provides the multi-strike diac with the output voltage signal, as described herein, so that the multi-strike diac breaks or turns off, as is appropriate, either triggering further ignition strikes or ending further ignition strikes. Alternatively or additionally, in some embodiments, the microcontroller operates the switch of the inverter circuit, either directly based on software or indirectly based on discrete analog components controlled by the microcontroller, such that the switch of the inverter circuit is shorted or not, as is appropriate, triggering either the deactivation or activation of the inverter circuit. Thus, embodiment described herein may, and in some embodiments, do, use a microcontroller and associated hardware components and/or software instructions and/or both to perform the operations of the multiple ignition strike circuit and/or the output voltage detection circuit and/or portions and/or combinations thereof.

Figure 3:
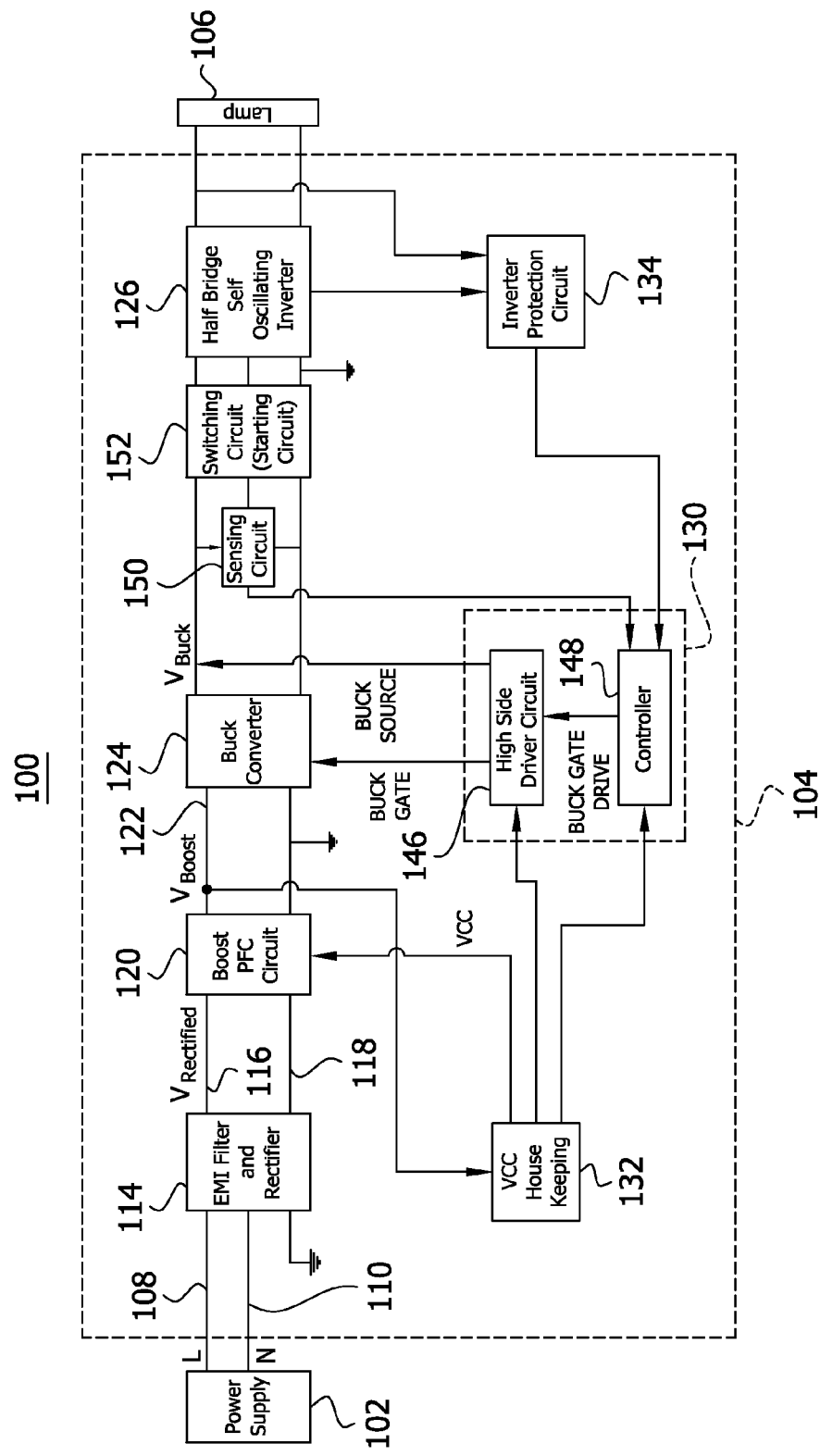
FIG. 3 is a block diagram of a lamp system according to embodiments disclosed herein.

FIG. 3 illustrates a lamp system 100 that includes an input power source, such as but not limited to an alternating current (AC) power supply 102, an electronic ballast 104 (hereinafter ballast 104), and a lamp 106. It should be noted that the lamp 106 may be a single lamp, or may be a plurality of lamps connected together in series. In some embodiments, the lamp 106 is an electrodeless lamp, such as the ICETRON® lamp available from OSRAM SYLVANIA, the QL induction lamp available from Philips, the GENURA lamp available from General Electric, or the EVERLIGHT lamp available from Matsushita. Of course, embodiments contemplate the use of other types of lamps as well.

The ballast 104 includes at least one high voltage input terminal (i.e., line voltage input terminal) 108 adapted for connecting to the alternating current (AC) power supply 102 (e.g., standard 120V AC household power), a neutral input terminal 110, and a ground terminal connectable to a ground potential (not shown in FIG. 3). An input AC power signal is received by the ballast 104 from the AC power supply 102 via the high voltage input terminal 108. The ballast 104 includes an electromagnetic interference (EMI) filter and a rectifier (e.g., full-wave rectifier) 114, which are illustrated together in FIG. 3. The EMI filter portion of the EMI filter and rectifier 114 prevents noise that may be generated by the ballast 104 from being transmitted back to the AC power supply 102. The rectifier portion of the EMI filter and rectifier 114 converts AC voltage received from the AC power supply 102 to direct current (DC) voltage. The rectifier portion includes a first output terminal connected to a DC bus 116 and a second output terminal connected to a ground potential at a ground connection point 118. Thus, the EMI filter and rectifier 114 outputs a DC voltage ($V_{Rectified}$) on the DC bus 116.

A power factor correction circuit 120, which may be, in some embodiments, a boost converter, is connected to the first and second output terminals of the EMI filter and rectifier 114. The power factor correction circuit 120 receives the rectified DC voltage ($V_{Rectified}$) and produces a high DC voltage ($V_{Boost}$) on a high DC voltage bus 122. For example, the power factor correction circuit 120 may provide a voltage of around 465 volts to the high DC voltage bus 122. A DC to DC converter, such as but not limited to a buck converter 124, is connected to the power factor correction circuit 120 via the high DC voltage bus 122. The buck converter 124 reduces the high DC voltage ($V_{Boost}$) received via the high DC voltage bus 122 and, thus, generates a stepped down DC voltage signal ($V_{Buck}$). The buck converter 124 is designed so that the DC voltage signal ($V_{Buck}$) generated thereby has a particular peak value ("peak DC buck voltage value"). An inverter circuit, such as but not limited to a half bridge self oscillating inverter 126 (hereinafter "inverter 126"), is connected to the buck converter circuit 124 for receiving the stepped down DC voltage ($V_{Buck}$) and converting it to an oscillating voltage for supplying to the lamp 106.

As detailed below, a sensing circuit 150 and a switching circuit 152 are connected between the buck converter 124 and the inverter 126. The switching circuit 152 has a first terminal connected to the buck converter 124 via the sensing circuit 150, and has a second terminal connected to the inverter 126. The sensing circuit 150 senses voltage at the first terminal of the switching circuit 152. The switching circuit 152 includes a switching component (not shown in FIG. 3), such as but not limited to a diode for alternating current (DIAC), that has a predetermined breakover voltage. The switching component operates between a non-conductive state (i.e., not conducting current) and a conductive state (conducting current). The switching component operates in the conductive state only after its breakover voltage has been reached. When the ballast 104 is powered on, the buck converter 124 begins receiving power from the power factor correction circuit 120, and the switching component operates in the non-conductive state. Accordingly, voltage builds at the first terminal of the switching circuit 152. When the voltage at the first terminal of the switching circuit 152 increases to the breakover voltage, the switching component switches from operating in the non-conductive state to operating in the conductive state and a startup signal is thereby provided to the inverter 126. In response to receiving the startup signal, the inverter 126 begins self oscillation, and produces the oscillating voltage signal that ignites and operates (i.e., energizes) the lamp 106.

Thus, the ballast 104 has three modes of operation: a start up mode, an inverter activation mode, and a normal operating mode. The ballast 104 operates in the start up mode when the ballast begins receiving power but the inverter 126 has not yet been energized. Accordingly, during the start up mode, the voltage at the first terminal of the switching circuit 152 is increasing to the breakover voltage. The ballast 104 operates in the inverter activation mode when the inverter 126 is energized. Accordingly, during the inverter activation mode, the voltage at the first terminal of the switching circuit 152 reaches the breakdown voltage, causing the switching component to breakdown and conduct a startup signal (e.g., voltage pulse) to the inverter 126 so that the inverter 126 will begin self oscillating. The ballast 104 operates in the normal operating mode when the inverter 126 self oscillates and energizes the lamp 106. Accordingly, the lamp 106 is ignited and produces light during the normal operating mode.

The lamp system 100 includes a control circuit 130 for controlling components of the lamp system 100, and a power supply (VCC) house keeping circuit 132 for powering components of the lamp system 100 including the control circuit 130. The control circuit 130 is connected to the buck converter 124 for driving the buck converter 124 during each of the three operating modes. The control circuit 130 is also connected to the sensing circuit 150. As described below, during the start up mode, the control circuit 130 monitors the voltage at the first terminal of the switching circuit 152 as sensed by the sensing circuit 152 (i.e., "sensed voltage"). When the sensed voltage increases to a predetermined voltage that is less than the breakover voltage, the control circuit 130 drives the buck converter 124 to generate a voltage pulse. The voltage pulse has the peak DC buck voltage value and ensures that the voltage at the first terminal of the sensing circuit 152 reaches the breakover voltage and that the lamp 106 is reliably started. In some embodiments, the control circuit 130 is configured to drive the buck converter 124 to generate a voltage pulse when the sensed voltage reaches a plurality of predetermined voltage values during the start up mode. During the normal operating mode, the control circuit 130 is configured to drive the buck converter 124 to generate an output voltage $V_{Buck}$ that is converted to an oscillating voltage signal and provided to the lamp 106 for energizing the lamp 106.

In FIG. 3 as shown, the lamp system 100 includes an inverter protection circuit 134 connected to the inverter 126. The inverter protection circuit 134 senses the AC voltage signal being provided to the lamp 106 and detects conditions that warrant shutting down the inverter 126. For example, the inverter protection circuit 134 detects a degas condition wherein the lamp 106 is connected to the ballast 104 but is broken, cracked, or otherwise not ignited. The inverter protection circuit 134 also detects a re-lamp condition wherein the lamp 106 is not present or because wires used to connect the lamp 106 to the ballast 104 have become disconnected during normal operation. If the inverter protection circuit 134 detects a degas condition or a re-lamp condition, the inverter protection circuit 134 indicates the presence of the condition to the control circuit 130 via an input signal. In response to receiving an indication of either the degas condition or the re-lamp condition from the inverter protection circuit 134, the control circuit 130 shuts down the power factor correction circuit 120, the buck converter 124, and the inverter 126 via an output signal. Of course, the inverter protection circuit 134 may detect other error condition(s) and inform the control circuit 130 via signal of such other error condition(s).

Figure 4:
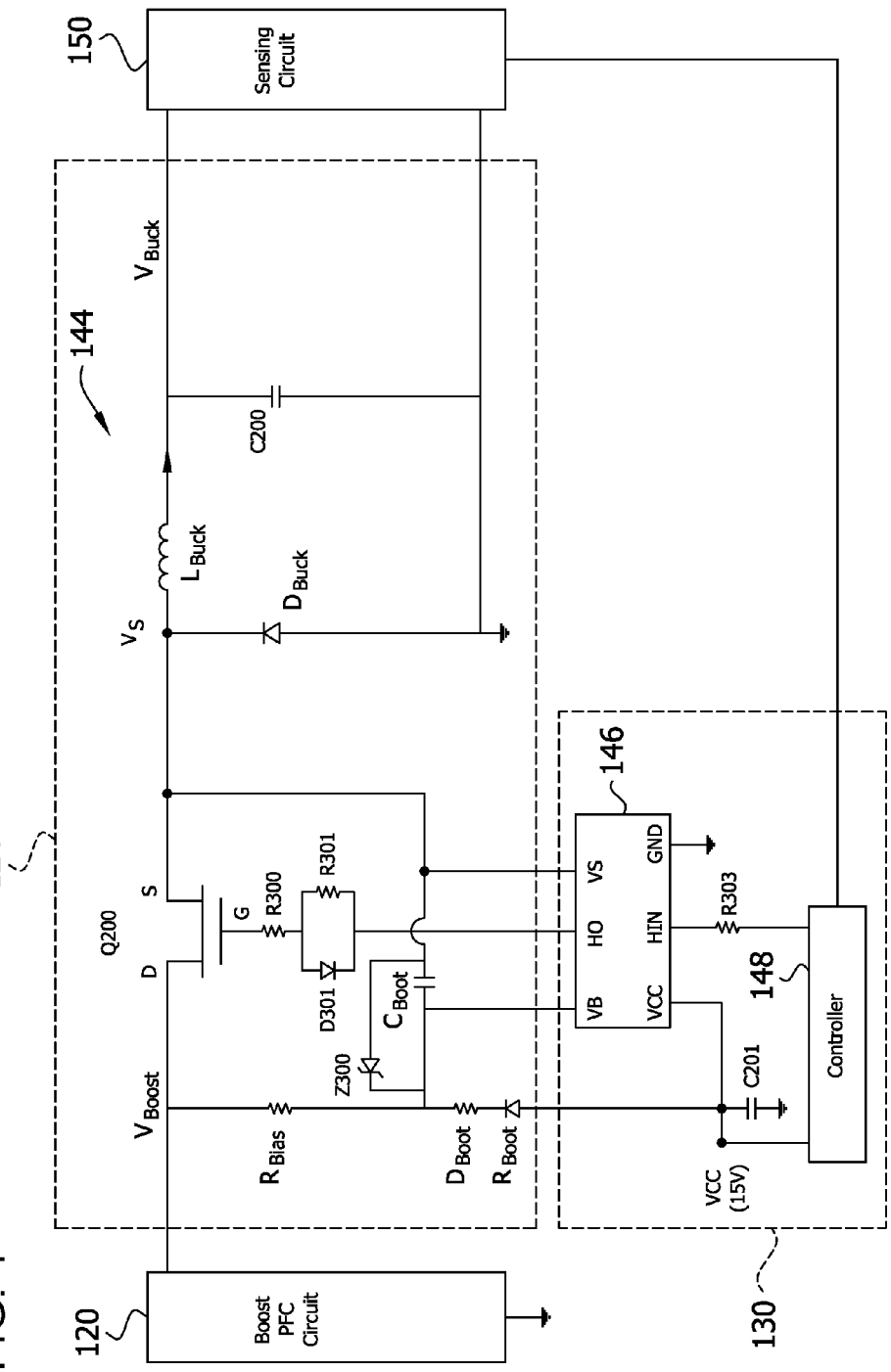
FIG. 4 is a schematic diagram of a buck converter and a control circuit of the lamp system of FIG. 3 according to embodiments disclosed herein.

FIG. 4 is a schematic of an exemplary buck converter 124 and an exemplary control circuit 130. In some embodiments, during the normal operating mode, the buck converter 124 operates as a switched-mode power supply that has a duty cycle that determines the magnitude of the DC voltage signal ($V_{Buck}$) that is produced by the buck converter 124 from the high DC voltage fixed magnitude signal ($V_{Boost}$) received by the buck converter 124. The control circuit 130 drives the buck converter 124 and thus controls the duty cycle. In FIG. 4, the control circuit 130 includes a buck driver 146 (e.g., part FAN7382 High- and Low-Side Gate Driver available from Fairchild Semiconductor) and a controller 148 (e.g., microprocessor). The controller 148 generates a control signal indicative of a switching operation for the buck converter 124, and provides the control signal to the buck driver 146. The buck driver 146, in turn, drives the switching operation of the buck converter 124 according to the control signal.

Referring to FIG. 4, as generally known, the buck converter 124 includes a first switch, a second switch, an inductor, and a capacitor. In accordance therewith, the illustrated buck converter 124 includes a metal-oxide-semiconductor field-effect transistor (buck MOSFET) Q200, a buck diode $D_{BUCK}$, a buck inductor $L_{BUCK}$, and a buck capacitor C200. The buck MOSFET Q200 has a drain terminal, a gate terminal, and a source terminal. A gate drive circuit formed by a resistor R300, a diode 301, and a resistor R301 is connected to the gate terminal of the buck MOSFET Q200 for driving the gate terminal. A bootstrapping circuit (i.e., a bootstrapping capacitor $C_{BOOT}$, a bootstrapping diode $D_{BOOT}$, and a bootstrapping resistor $R_{BOOT}$) is connected between the source terminal of the buck MOSFET Q200 and the power supply $V_{CC}$ for providing a sufficient gate to source voltage for the buck MOSFET Q200. In particular, the bootstrapping diode $D_{BOOT}$ has an anode connected to the power supply $V_{CC}$ and a cathode connected to a first terminal of the bootstrapping resistor $R_{BOOT}$ so that the bootstrapping diode $D_{BOOT}$ and the bootstrapping resistor $R_{BOOT}$ are connected together in series. A second terminal of the bootstrapping resistor $R_{BOOT}$ is connected to a first terminal of the bootstrapping capacitor $C_{BOOT}$, and a second terminal of the bootstrapping capacitor $C_{BOOT}$ is connected to the source terminal of the buck MOSFET Q200. Thus, the bootstrapping capacitor $C_{BOOT}$ is charged from the power supply $V_{CC}$ via the bootstrapping resistor $R_{BOOT}$ and the bootstrapping diode $D_{BOOT}$ when the voltage at a source terminal $V_S$ is less than the power supply voltage $V_{CC}$. In some embodiments, the first terminal of the bootstrapping capacitor $C_{BOOT}$ is also connected to the first terminal of the buck converter 124 via a resistor $R_{BIAS}$ so that the bootstrapping capacitor $C_{BOOT}$ can derive a charging current from $V_{Boost}$. In some embodiments, a zener diode Z300 is connected in parallel with the bootstrapping capacitor $C_{BOOT}$.

During normal operating mode, the MOSFET Q200 and the buck diode $D_{BUCK}$ operate so as to alternately connect and disconnect the buck inductor $L_{BUCK}$ to the boost PFC circuit 120. In other words, buck inductor $L_{BUCK}$ alternately receives the high DC voltage ($V_{Boost}$) from the boost PFC circuit 120 as a function of the buck MOSFET Q200 and the buck diode $D_{BUCK}$. When the buck MOSFET Q200 is conductive (e.g., closed; ON), current flows from the boost PFC circuit 120 through the buck inductor $L_{BUCK}$, the buck capacitor C200, and a shunt resistor (not shown). The high DC voltage ($V_{Boost}$) from the boost PFC circuit 120 reverse-biases the buck diode $D_{BUCK}$, so no current flows through the buck diode $D_{BUCK}$. On the other hand, when the buck MOSFET Q200 is non-conductive (e.g., open; OFF), the buck diode $D_{BUCK}$ is forward biased and thus conducts current. Accordingly, current flows in a path from the buck inductor $L_{BUCK}$ and passing through the buck capacitor $C_{BUCK}$, the shunt resistor (not shown), and the buck diode $D_{BUCK}$. Thus, the buck inductor $L_{BUCK}$ stores energy (e.g., charges) from the boost PFC circuit 120 while the buck MOSFET Q200 is conductive and dissipates energy (e.g., discharges) to the inverter 126 while the buck MOSFET Q200 is non-conductive. The amount of time that the buck MOSFET Q200 is conductive during a period of one conductive and one non-conductive state (i.e., during a period) is the duty cycle for the buck converter 124. When the buck MOSFET Q200 is operating in the non-conductive state, the voltage at the source terminal $V_S$ is close to ground potential, enabling the bootstrapping capacitor $C_{BOOT}$ to charge. The bootstrapping capacitor $C_{BOOT}$ discharges energy for providing a sufficient gate to source voltage for the buck MOSFET Q200 in order to switch the buck MOSFET Q200 from the non-conductive state to the conductive state.

As described above, during the start up operating mode, the switching component operates in a non-conductive state because the voltage at the input terminal of the switching component has not yet reached the breakover voltage. As such, the inverter 126 does not operate as a load on the buck converter 124, so the buck MOSFET Q200 operates in the non-conductive state and current through the inductor $L_{BUCK}$ is low. This results in small inductive kickback so the voltage $V_S$ at the source terminal of the buck MOSFET Q200 is high (i.e., greater than $V_{CC}$). Because the voltage $V_S$ at the source terminal of the buck MOSFET Q200 is high, the bootstrapping capacitor $C_{BOOT}$ is not charged from the power supply $V_{CC}$. Additionally, when current through the resistor $R_{BIAS}$ falls below a threshold value, the bootstrapping capacitor $C_{BOOT}$ does not derive a charging current from $V_{Boost}$.

In order to ensure that the bootstrapping capacitor $C_{BOOT}$ charges and the voltage at the input terminal of the switching component increases to the breakover voltage, embodiments pulse the buck MOSFET Q200 from the non-conductive state to the conductive state ("pulsed ON") during the start up operating mode. In some embodiments, the buck MOSFET Q200 is initially pulsed (e.g., pulsed at a beginning time of the start up operating mode) on to ensure that the buck output voltage $V_{Buck}$ rises to the peak DC buck voltage value and that the bootstrapping capacitor $C_{BOOT}$ charges. Since the inverter 126 is not operating as a load on the buck converter 124, after the initial pulse(s) the bootstrapping capacitor $C_{BOOT}$ dissipates and the buck output voltage $V_{Buck}$ begins to fall (i.e., decrease). Thus, during the start up operating mode, at one or more points in time subsequent to the time of the initial pulse, the buck MOSFET Q200 is again pulsed on so that the buck output voltage $V_{Buck}$ rises back to the peak DC buck voltage value and the bootstrapping capacitor $C_{BOOT}$ recharges. In some embodiments, the time that the buck MOSFET Q200 is pulsed on may be based on the voltage value at the input of the switching circuit 152. For example, in FIGS. 1 and 2, the sensing circuit 150 senses the voltage at the input terminal of the switching circuit 152. The controller 148 monitors this sensed voltage. When the sensed voltage reaches a predetermined value(s) (i.e., less than the breakover voltage), the controller 148 provides a pulse to the gate drive of the buck converter driver 146 so that the buck MOSFET Q200 is pulsed on. Once the voltage at the input terminal of the switching circuit 152 reaches the breakover voltage, the switching circuit 152 conducts a start up signal to the inverter 126 and the inverter 126 begins oscillating and operates as a load to the buck converter 124.

Figure 5:
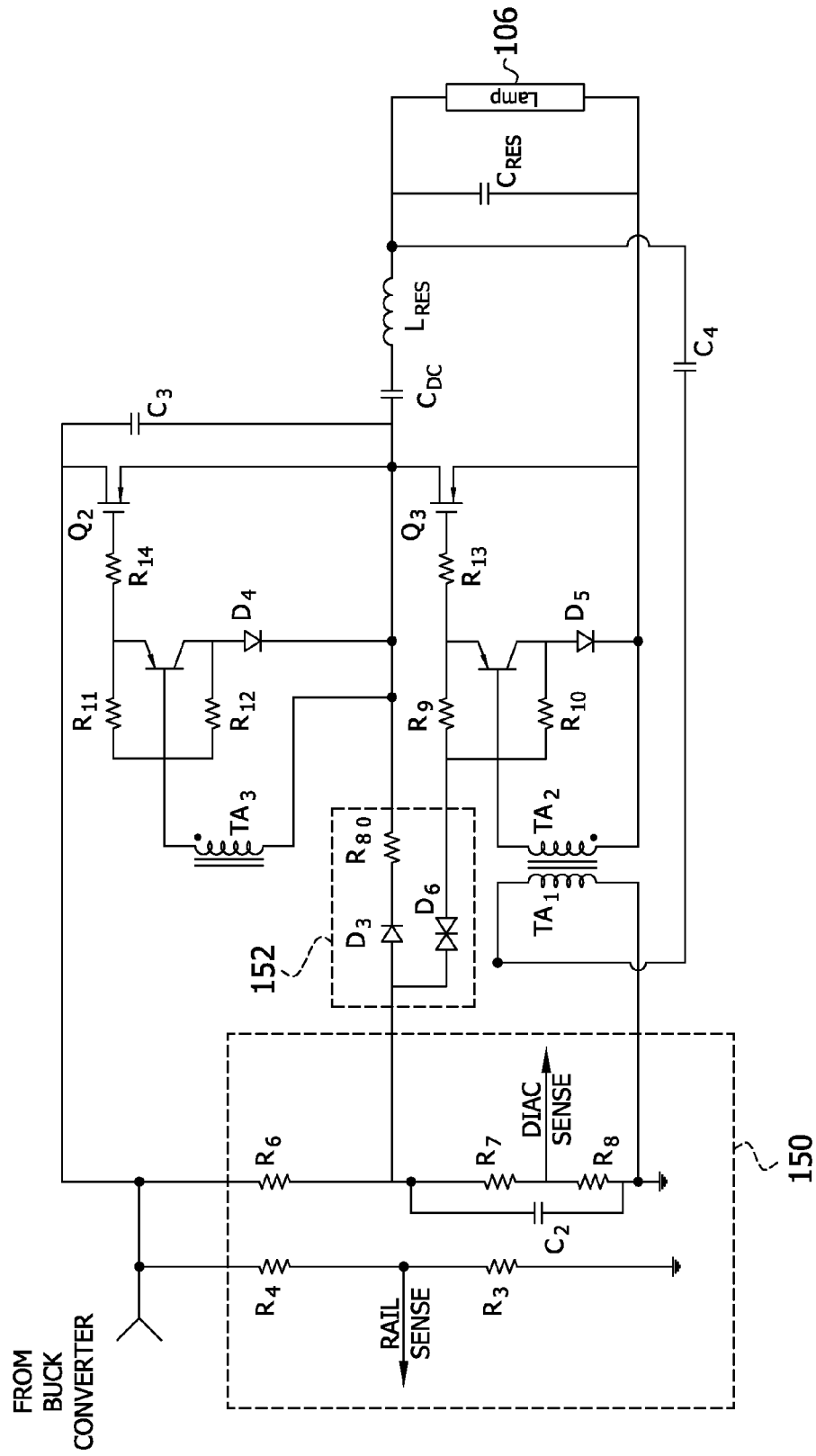
FIG. 5 is a schematic diagram of a sensing circuit, switching circuit, and inverter of the lamp system of FIG. 3 according to embodiments disclosed herein.

FIG. 5 is a schematic of the sensing circuit 150, the switching circuit 152, and the inverter 126. In FIG. 5, the sensing circuit 150 includes resistors R4 and R3 connected in series for sensing the output voltage $V_{Buck}$ of the buck converter 124. The sensing circuit also includes resistors R6, R7, R8, and a capacitor C2 for sensing the voltage at the input terminal of the switching circuit 152. In particular, the resistor R6 is connected to the output terminal of the buck converter 124. The resistors R7 and R8 are connected together in series between the resistor R6 and a ground potential. Together the resistors R6, R7, and R8 form a voltage divider. The capacitor C2 is connected in parallel with the series connected resistors R7 and R8. The capacitor C2 stores energy derived from the output voltage $V_{Buck}$ of the buck converter 124 and thus generates the voltage ($V_A$) at the input terminal of the switching circuit 152. In FIG. 5 as shown, the controller 146 is connected to the sensing circuit 150 at a junction between the resistors R7 and R8. Thus, the sensed voltage provided by the sensing circuit 150 to the controller 146 is the voltage across the resistor R8. The voltage across the resistor R8 is indicative of (e.g., proportional to) the voltage $V_A$ at the input to input terminal of the switching circuit 152. The time required for the voltage $V_A$ at the input terminal of the switching circuit 152 to reach the predetermined breakover voltage is a function of a time constant formed by the network of the capacitor C2 and the resistors R7 and R8.

The switching circuit 152 includes a DIAC (broadly "switching component") D6, a diode D3, and a resistor R80. The combination of one or more of these components may also commonly be referred to as a starting circuit. The DIAC has a predetermined breakover voltage. In some embodiments, the breakover voltage is 32 Volts, or substantially 32 Volts. Responsive to the voltage $V_A$ generated by the capacitor C2 increasing to the breakover voltage, the DIAC D6 conducts current to the inverter 126, thereby providing a startup signal to the inverter 126. Once the inverter 126 begins to oscillate, the DIAC D6 switches to a non-conductive state and current is conducted from the buck converter 124 to the inverter 126 via the diode D3 and the resistor R80.

In FIG. 5, the inverter 126 includes a first switching component Q2 and a second switching component Q3. For example, the first and second switching components, Q2 and Q3, may each comprise a metal-oxide-semiconductor field-effect transistor (MOSFET). As such, the first switching component Q2 and the second switching component Q3 each have a gate terminal, a drain terminal, and a source terminal. A first gate drive circuit comprising a resistor R14, a resistor R4, a resistor R12, and a diode D4 is connected at the gate terminal of the first switching component Q2. A second gate drive circuit comprising a resistor R13, a resistor R9, a resistor R10, and a diode D5 is connected at the gate terminal of the second switching component Q3. The DIAC D6 of the switching circuit 152 is connected to the gate terminal of the second switching component Q3 for initially activating the second switching component Q3. Thus, once the voltage $V_A$ at the input terminal of the switching circuit 152 reaches the breakover voltage, the DIAC D6 conducts a startup signal (e.g., gate pulse) to the second switching component Q3. Once the second switching component Q3 is initially turned on via the startup signal, the first and second switching components, Q2 and Q3, are complementarily commutated via the first and second gate drive circuits. In other words, the first and second switching components, Q2 and Q3, are operated such that when the first switching component Q2 is conductive (e.g., ON), the second switching component Q3 is non-conductive (e.g., OFF). Likewise, when the second switching component Q3 is conductive (e.g., ON), the first switching component Q2 is non-conductive (e.g., OFF). The inverter circuit 124 also includes a resonant circuit comprising an inductor $L_{RES}$ and a capacitor $C_{RES}$ connected together in series. The resonant circuit $L_{RES}$, $C_{RES}$ is connected to the source terminal of the first switching component Q2 via a DC blocking capacitor $C_{DC}$. The resonant circuit $L_{RES}$, $C_{RES}$ provides a high voltage for igniting the lamp 106 and a magnitude-limited current for operating the lamp 106 at a particular current. In some embodiments, a capacitor $C_{ZVS}$ is connected between the drain terminal and the gate terminal of the first switching component Q2 for improving EMI and ensuring zero voltage switching.

Figure 6:
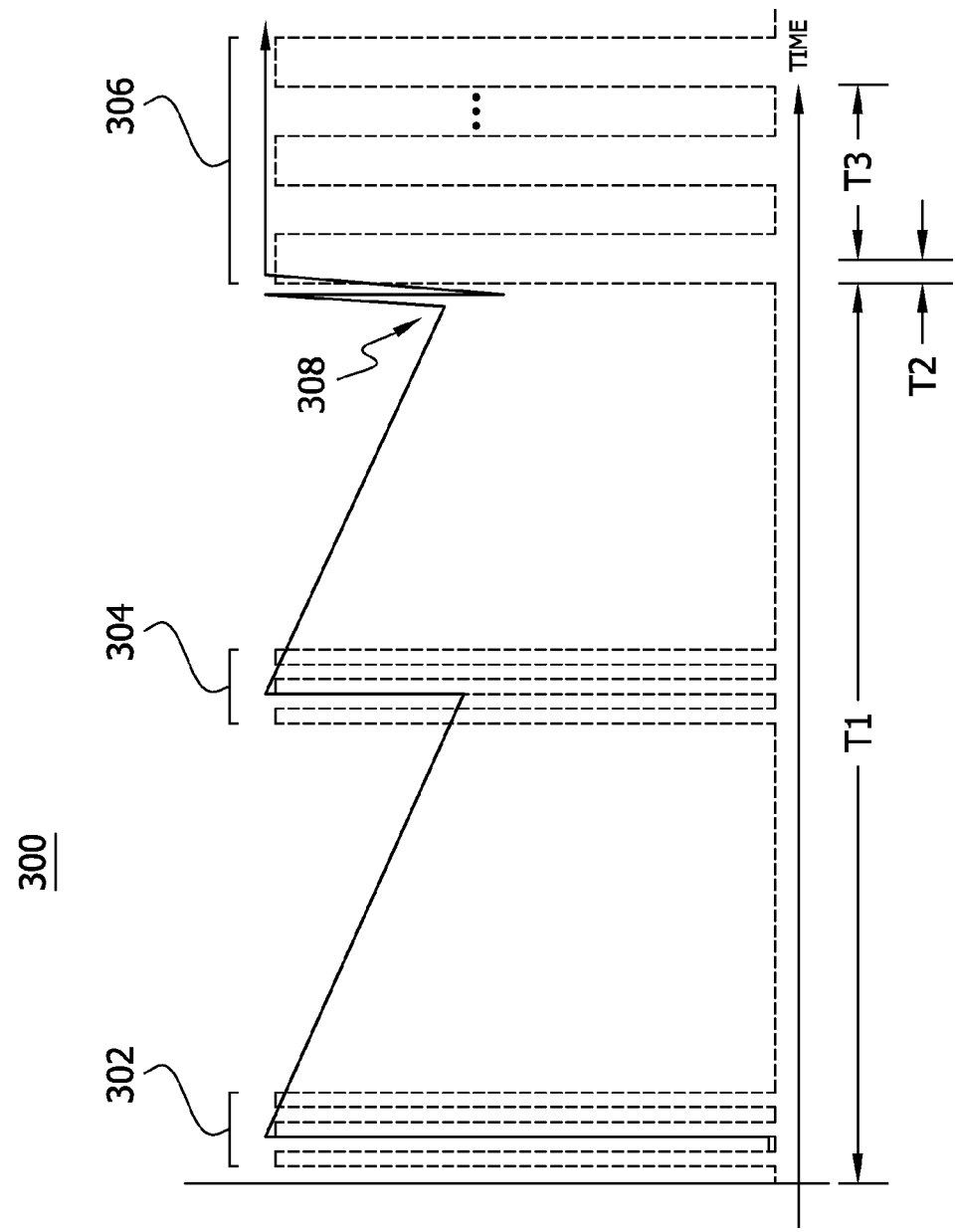
FIG. 6 is a timing diagram of a gate drive signal and of a voltage output signal during the start up mode according to embodiments disclosed herein.

FIG. 6 is a timing diagram 300 generally illustrating the gate drive pulses generated by the control circuit 130 (indicated via the dashed line trace) and the DC voltage $V_{Buck}$ generated by the buck converter 124 (indicated via the solid line trace) during the three operation modes of the ballast 104. In particular, T1 indicates the time period during which the ballast 104 is operating in the startup mode, T2 indicates the time period during which the ballast 104 is operating in the inverter activation mode, and T3 indicates the time period during which the ballast 104 is operating in the normal operating mode. As illustrated, at the beginning of the startup mode, a set of initial gate drive pulses 302 are generated in order to drive the DC voltage $V_{Buck}$ generated by the buck converter 124 to a predetermined peak value. As explained above, after the initial gate drive pulses 302 pump the DC voltage $V_{Buck}$ up to the peak value, the DC voltage $V_{Buck}$ begins to decrease. Another set of gate drive pulses (set of intermediate gate drive pulses) 304 are generated in order to drive the DC voltage $V_{Buck}$ generated by the buck converter 124 back up to the predetermined peak value. Subsequent to the generation of the set of intermediate gate drive pulses (indicated at 308), the voltage at the switching component reaches the predetermined breakover voltage.

As such, the ballast 104 begins operating in the inverter activation mode, indicated at T2. During the inverter activation mode, the switching component conducts the start up signal to the inverter 126. The inverter 126 then begins oscillating and the ballast 104 operates in the normal operating mode, indicated at T3. During the normal operating mode, the control circuit 130 provides gate drive pulses 306 having a particular duty cycle for driving the buck converter 124 to generate a target DC voltage $V_{Buck}$ which converted by the inverter 126 to an oscillating signal and supplied to the lamp 106.

Figure 7:
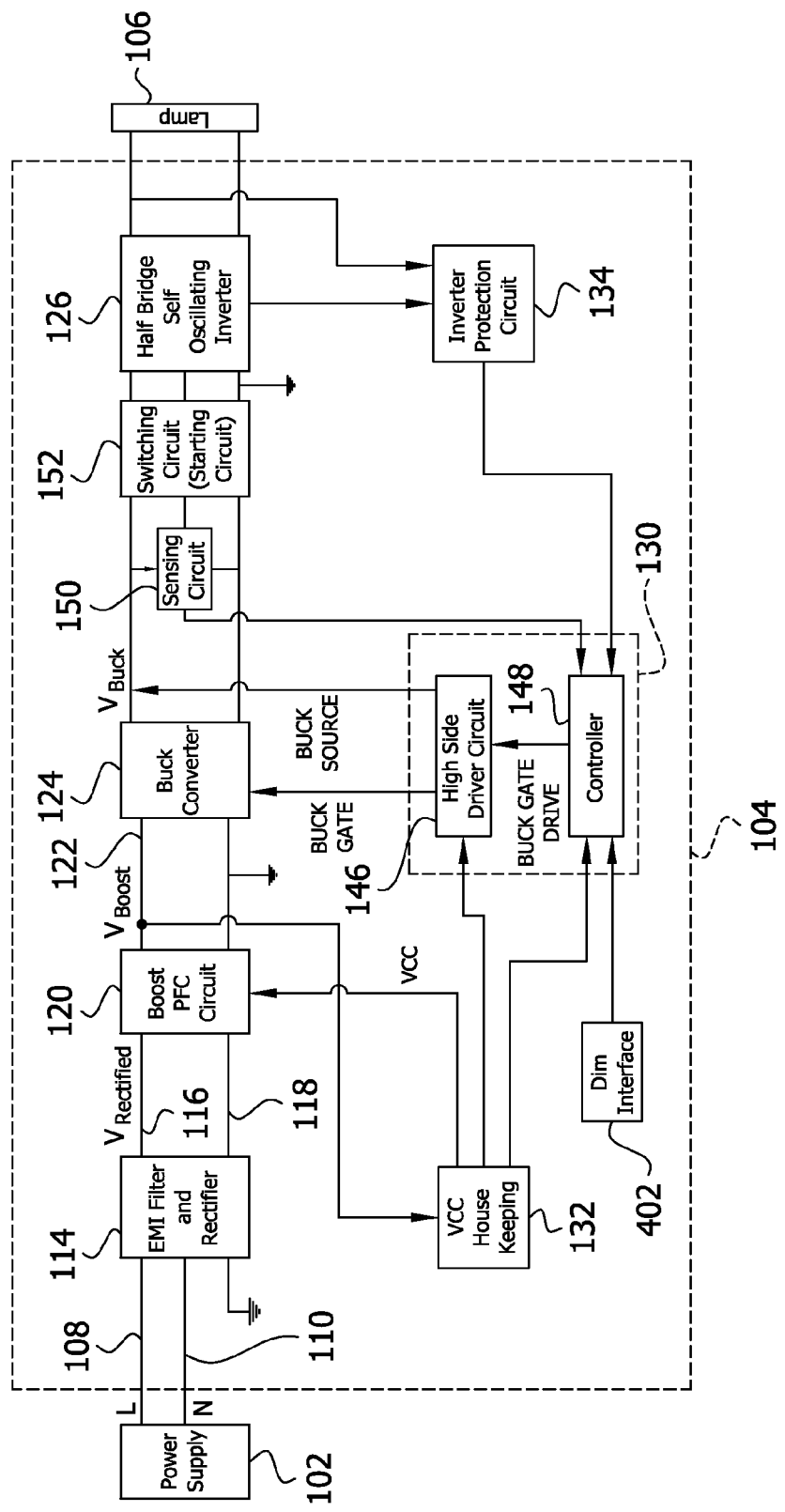
FIG. 7 is a block diagram of a lamp system according to embodiments disclosed herein.

FIG. 7 is a block diagram illustrating a lamp system 100A. In addition to the components discussed above in connection with the lamp system 100 shown in FIG. 3, the lamp system 100A includes a dim interface 402 (e.g., step dim interface, continuous dim interface) connected to the control circuit 130. The dim interface 402 receives an input indicative of a selected lighting level of a plurality of lighting levels. The dim interface 402 provides a dim signal indicative of the selected lighting level to the control circuit 130. The control circuit 130 drives the buck converter circuit 124 so that the DC voltage $V_{Buck}$ generated by the buck converter 124, once being converted to an oscillating voltage signal by the inverter 126, will energize the lamp 106 at the selected lighting level. In particular, the control circuit 130 determines a duty cycle (e.g., on switching time and off switching time) for the buck converter 124 that will step down the high DC voltage fixed magnitude signal ($V_{Boost}$) to generate a DC voltage signal ($V_{Buck}$) having a magnitude for energizing the lamp 106 at the selected lamp lighting level. The control circuit 130 provides a control signal (BUCK_PWM_IN) to the buck converter 124 indicating the determined duty cycle. In response to receiving the control signal (BUCK_PWM_IN) from the control circuit 130, the buck converter 124 adjusts the duty cycle to the determined duty cycle in order to produce the DC voltage signal ($V_{Buck}$) having a magnitude for energizing the lamp 106 at the selected lamp lighting level.

Figure 8:
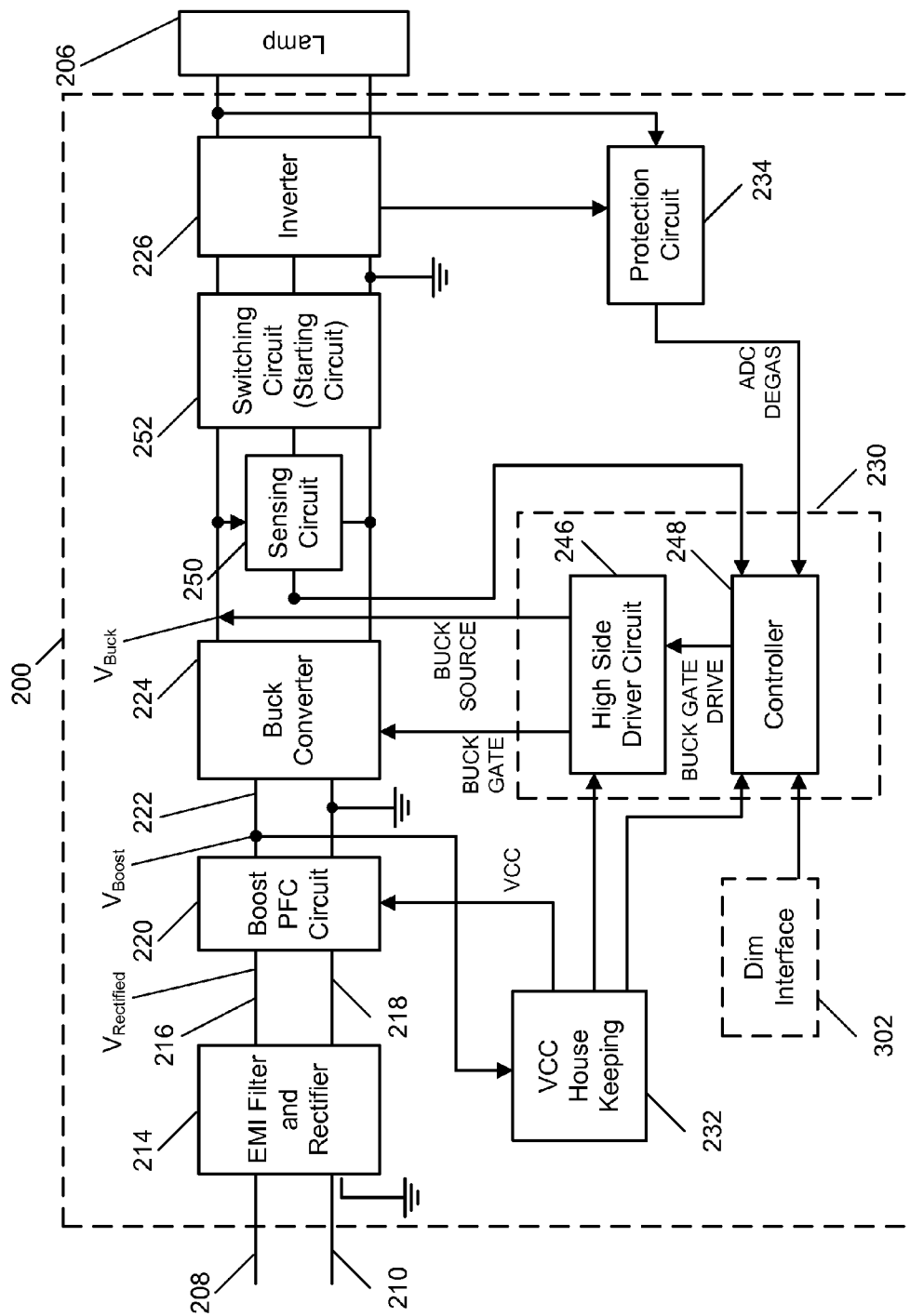
FIG. 8 shows a block diagram of a multi-strike ballast with lamp protection according to embodiments disclosed herein.

FIG. 8 illustrates a ballast 200 that receives power from an input power source, as but not limited to an alternating current (AC) power supply (not shown), and ignites a lamp 206. It should be noted that the lamp 206 may be a single lamp, or may be a plurality of lamps connected together in series. In some embodiments, the lamp 206 is an electrodeless lamp, such as the ICETRON® lamp available from OSRAM SYLVANIA, the QL induction lamp available from Philips, the GENURA lamp available from General Electric, or the EVERLIGHT lamp available from Matsushita. Of course, embodiments contemplate the use of other types of lamps as well. The ballast 200 includes at least one high voltage input terminal (i.e., line voltage input terminal) 208 adapted for connecting to the alternating current (AC) power supply (e.g., standard 120V AC household power), a neutral input terminal 210, and a ground terminal connectable to a ground potential (not shown in FIG. 8). An input AC power signal is received by the ballast 200 from the AC power supply via the high voltage input terminal 208. The ballast 200 includes an electromagnetic interference (EMI) filter and a rectifier (e.g., full-wave rectifier) 214, which are illustrated together in FIG. 8. The EMI filter portion of the EMI filter and rectifier 214 prevents noise that may be generated by the ballast 200 from being transmitted back to the AC power supply. The rectifier portion of the EMI filter and rectifier 214 converts AC voltage received from the AC power supply to direct current (DC) voltage. The rectifier portion includes a first output terminal connected to a DC bus 216 and a second output terminal connected to a ground potential at a ground connection point 218. Thus, the EMI filter and rectifier 214 outputs a DC voltage ($V_{Rectified}$) on the DC bus 216.

A power factor correction circuit 220, which may be, in some embodiments, a boost converter, is connected to the first and second output terminals of the EMI filter and rectifier 214. The power factor correction circuit 220 receives the rectified DC voltage ($V_{Rectified}$) and produces a high DC voltage ($V_{Boost}$) on a high DC voltage bus 222. For example, the power factor correction circuit 220 may provide a voltage of around 465 volts to the high DC voltage bus 222. A DC to DC converter, such as but not limited to a buck converter 224, is connected to the power factor correction circuit 220 via the high DC voltage bus 222. The buck converter 224 reduces the high DC voltage ($V_{Boost}$) received via the high DC voltage bus 222 and, thus, generates a stepped down DC voltage signal ($V_{Buck}$). The buck converter 224 is designed so that the DC voltage signal ($V_{Buck}$) generated thereby has a particular peak value ("peak DC buck voltage value"). An inverter circuit, such as but not limited to a half bridge self oscillating inverter 226 (hereinafter "inverter 226"), is connected to the buck converter circuit 224 for receiving the stepped down DC voltage ($V_{Buck}$) and converting it to an oscillating voltage for supplying to the lamp 206.

As detailed below, a sensing circuit 250 and a switching circuit 252 are connected between the buck converter 224 and the inverter 226. The switching circuit 252 has a first terminal connected to the buck converter 224 via the sensing circuit 250, and has a second terminal connected to the inverter 226. The sensing circuit 250 senses voltage at the first terminal of the switching circuit 252. The switching circuit 252 includes a switching component (not shown in FIG. 8), such as but not limited to a diode for alternating current (DIAC), that has a predetermined breakover voltage. The switching component operates between a non-conductive state (i.e., not conducting current) and a conductive state (conducting current). The switching component operates in the conductive state only after its breakover voltage has been reached. When the ballast 200 is powered on, the buck converter 224 begins receiving power from the power factor correction circuit 220, and the switching component operates in the non-conductive state. Accordingly, voltage builds at the first terminal of the switching circuit 252. When the voltage at the first terminal of the switching circuit 252 increases to the breakover voltage, the switching component switches from operating in the non-conductive state to operating in the conductive state and a startup signal is thereby provided to the inverter 226. In response to receiving the startup signal, the inverter 226 begins self oscillation, and produces the oscillating voltage signal that ignites and operates (i.e., energizes) the lamp 206.

Thus, the ballast 200 has multiple modes of operation, including a start up mode, an inverter activation mode, a normal operating mode, and a protection mode. The ballast 200 operates in the start up mode when the ballast begins receiving power but the inverter 226 has not yet been activated. Accordingly, during the start up mode, the voltage at the first terminal of the switching circuit 252 is increasing to the breakover voltage. The ballast 200 operates in the inverter activation mode when the inverter 226 is activated. Accordingly, during the inverter activation mode, the voltage at the first terminal of the switching circuit 252 reaches the breakdown voltage, causing the switching component to breakdown and conduct a startup signal (e.g., voltage pulse) to the inverter 226 so that the inverter 226 will begin self oscillating. The ballast 200 operates in the normal operating mode when the inverter 226 self oscillates and energizes the lamp 206. Accordingly, the lamp 206 is ignited and produces light during the normal operating mode. The ballast 200 operates in the protection mode as described below.

The ballast 200 includes a control circuit 230 for controlling components of the ballast 200, and a power supply (VCC) house keeping circuit 232 for powering components of the ballast 200 including the control circuit 230. The control circuit 230 is connected to the buck converter 224 for driving the buck converter 224 during each of the operating modes. The control circuit 230 is also connected to the sensing circuit 250 and to the protection circuit 234. As described below, during the start up mode, the control circuit 230 monitors the voltage at the first terminal of the switching circuit 252 as sensed by the sensing circuit 250 (i.e., "sensed voltage"). When the sensed voltage increases to a predetermined voltage that is less than the breakover voltage, the control circuit 230 drives the buck converter 224 to generate a voltage pulse. The voltage pulse has the peak DC buck voltage value and ensures that the voltage at the first terminal of the sensing circuit 252 reaches the breakover voltage and that the inverter 226 is reliably started. In some embodiments, the control circuit 230 is configured to drive the buck converter 224 to generate a voltage pulse when the sensed voltage reaches a plurality of predetermined voltage values during the start up mode. During the normal operating mode, the control circuit 230 is configured to drive the buck converter 224 to generate an output voltage $V_{Buck}$ that is converted to an oscillating voltage signal and provided to the lamp 206 via the inverter 226 for energizing the lamp 206.

In FIG. 8 as shown, the ballast 200 includes a protection circuit 234 connected to the inverter 226 and a controller 248 of the control circuit 230. The protection circuit 234 senses changes in the AC voltage signal being provided to the lamp 206 that warrant shutting down the inverter 226. For example, the inverter protection circuit 234 detects a degas condition, as described further below, wherein the lamp 206 is connected to the ballast 200 but is broken, cracked, or otherwise not ignited. The protection circuit 234 also detects a lamp not ignited condition, wherein the lamp 206 has not yet ignited. If the protection circuit 234 detects a degas condition or a lamp not ignited condition, the protection circuit 234 indicates the presence of the condition to the control circuit 230 via an input signal ADC DEGAS. In response to receiving the ADC DEGAS signal from the protection circuit 234, the control circuit 230 shuts down the buck converter 224, as described below, resulting in shutdown of the inverter 226, as is described further below. Of course, the protection circuit 234 may and in some embodiments does detect other error condition(s) and inform the control circuit 230 of such other error condition(s).

In some embodiments, the ballast 200 includes a dim interface 302 (e.g., step dim interface, continuous dim interface) connected to the control circuit 230. The dim interface 302 receives an input indicative of a selected lighting level of a plurality of lighting levels. The dim interface 302 provides a dim signal indicative of the selected lighting level to the control circuit 230. The control circuit 230 drives the buck converter 224 so that the DC voltage $V_{Buck}$ generated by the buck converter 224, once being converted to an oscillating voltage signal by the inverter 226, will energize the lamp 206 at the selected lighting level. In particular, the control circuit 230 determines a duty cycle (e.g., on switching time and off switching time) for the buck converter 224 that will step down the high DC voltage fixed magnitude signal ($V_{Boost}$) to generate a DC voltage signal ($V_{Buck}$) having a magnitude for energizing the lamp 206 at the selected lamp lighting level. The control circuit 230 provides a control signal to the buck converter 224 indicating the determined duty cycle. In response to receiving the control signal from the control circuit 230, the buck converter 224 adjusts the duty cycle to the determined duty cycle in order to produce the DC voltage signal ($V_{Buck}$) having a magnitude for energizing the lamp 206 at the selected lamp lighting level.

Figure 9:
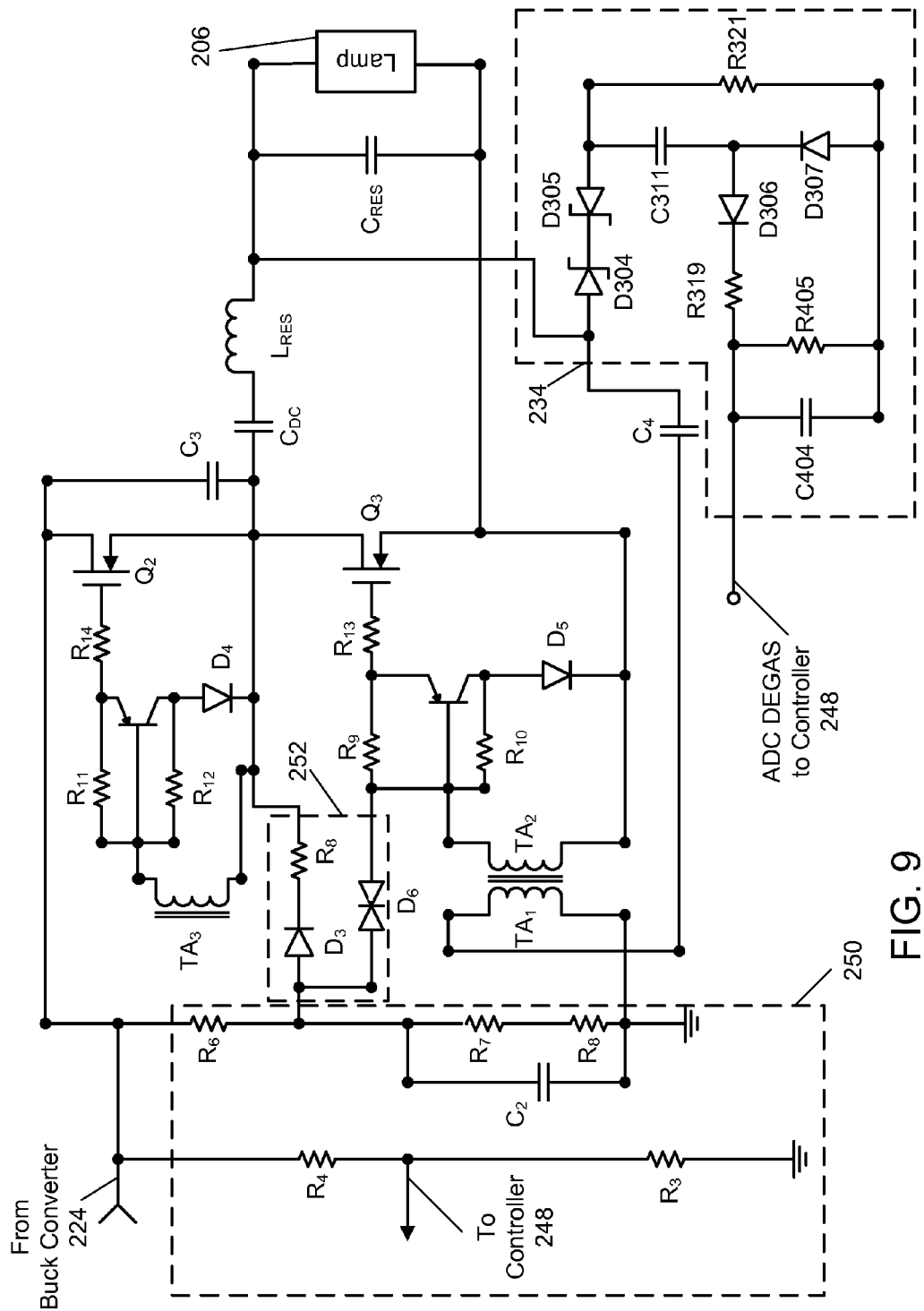
FIG. 9 shows a partial circuit diagram of an inverter circuit with a protection circuit of the ballast of FIG. 8 according to embodiments disclosed herein.

FIG. 9 is a schematic of the sensing circuit 250, the switching circuit 252, the inverter 226, and the protection circuit 234. In FIG. 9, the sensing circuit 250 includes resistors R4 and R3 connected in series for sensing the output voltage $V_{Buck}$ of the buck converter 224. The sensing circuit also includes resistors R6, R7, R8, and a capacitor C2 for sensing the voltage at the input terminal of the switching circuit 252. In particular, the resistor R6 is connected to the output terminal of the buck converter 224. The resistors R7 and R8 are connected together in series between the resistor R6 and a ground potential. Together the resistors R6, R7, and R8 form a voltage divider. The capacitor C2 is connected in parallel with the series connected resistors R7 and R8. The capacitor C2 stores energy derived from the output voltage $V_{Buck}$ of the buck converter 224 and thus generates the voltage ($V_A$) at the input terminal of the switching circuit 252. In FIG. 9 as shown, the controller 248 is connected to the sensing circuit 250 at a junction between the resistors R7 and R8. Thus, the sensed voltage provided by the sensing circuit 250 to the controller 248 is the voltage across the resistor R8. The voltage across the resistor R8 is indicative of (e.g., proportional to) the voltage at the input to input terminal of the switching circuit 252. The time required for the voltage at the input terminal of the switching circuit 252 to reach the predetermined breakover voltage is a function of a time constant formed by the network of the capacitor C2 and the resistors R7 and R8.

The switching circuit 252 includes a DIAC (broadly "switching component") D6, a diode D3, and a resistor R80. The combination of one or more of these components may also commonly be referred to as a starting circuit. The DIAC has a predetermined breakover voltage. In some embodiments, the breakover voltage is 32 Volts, or substantially 32 Volts. Responsive to the voltage generated by the capacitor C2 increasing to the breakover voltage, the DIAC D6 conducts current to the inverter 126, thereby providing a startup signal to the inverter 226. Once the inverter 226 begins to oscillate, the DIAC D6 switches to a non-conductive state and current is conducted from the buck converter 224 to the inverter 226 via the diode D3 and the resistor R80.

In FIG. 8, the inverter 226 includes a first switching component Q2 and a second switching component Q3. For example, the first and second switching components, Q2 and Q3, may each comprise a metal-oxide-semiconductor field-effect transistor (MOSFET). As such, the first switching component Q2 and the second switching component Q3 each have a gate terminal, a drain terminal, and a source terminal. A first gate drive circuit comprising a resistor R14, a resistor R4, a resistor R12, and a diode D4 is connected at the gate terminal of the first switching component Q2. A second gate drive circuit comprising a resistor R13, a resistor R9, a resistor R10, and a diode D5 is connected at the gate terminal of the second switching component Q3. The DIAC D6 of the switching circuit 252 is connected to the gate terminal of the second switching component Q3 for initially activating the second switching component Q3. Thus, once the voltage at the input terminal of the switching circuit 252 reaches the breakover voltage, the DIAC D6 conducts a startup signal (e.g., gate pulse) to the second switching component Q3. Once the second switching component Q3 is initially turned on via the startup signal, the first and second switching components, Q2 and Q3, are complementarily commutated via the first and second gate drive circuits. In other words, the first and second switching components, Q2 and Q3, are operated such that when the first switching component Q2 is conductive (e.g., ON), the second switching component Q3 is non-conductive (e.g., OFF). Likewise, when the second switching component Q3 is conductive (e.g., ON), the first switching component Q2 is non-conductive (e.g., OFF). The inverter 226 also includes a resonant circuit comprising an inductor $L_{RES}$ and a capacitor $C_{RES}$ connected together in series. The resonant circuit $L_{RES}$, $C_{RES}$ is connected to the source terminal of the first switching component Q2 via a DC blocking capacitor $C_{DC}$. The resonant circuit $L_{RES}$, $C_{RES}$ provides a high voltage for igniting the lamp 206 and a magnitude-limited current for operating the lamp 206 at a particular current. In some embodiments, a capacitor is connected between the drain terminal and the gate terminal of the first switching component Q2 (not shown) for improving EMI and ensuring zero voltage switching.

The protection circuit 234 is connected to both a connection point between the resonant inductor $L_{RES}$ and the resonant capacitor $C_{RES}$ and to the inverter 226 via a capacitor C4. The protection circuit 234 includes a pair of Zener diodes D304 and D305 connected back-to-back, such that the cathodes of the Zener diodes D304 and D305 are connected to each other. The protection circuit 234 also includes a capacitor C311 connected to the anode of the Zener diode D305 and in series with a first rectifier diode D307, and a resistor R321 connected in parallel across the capacitor C311 and the first rectifier diode D307. A first resistor R405, a second resistor R319, and a second rectifier diode D306 are all connected in series, the combination in parallel with the first rectifier diode D307. A filter capacitor C404 is connected in parallel across the first resistor R405. The capacitor C404 is connected to the controller 248 and, in some embodiments more specifically, to an ADC DEGAS pin of the controller 248. The protection circuit 234 senses a voltage associated with the lamp 206 and provides this sensed voltage and changes therein to the controller 248, as described in greater detail below.

Figure 10:
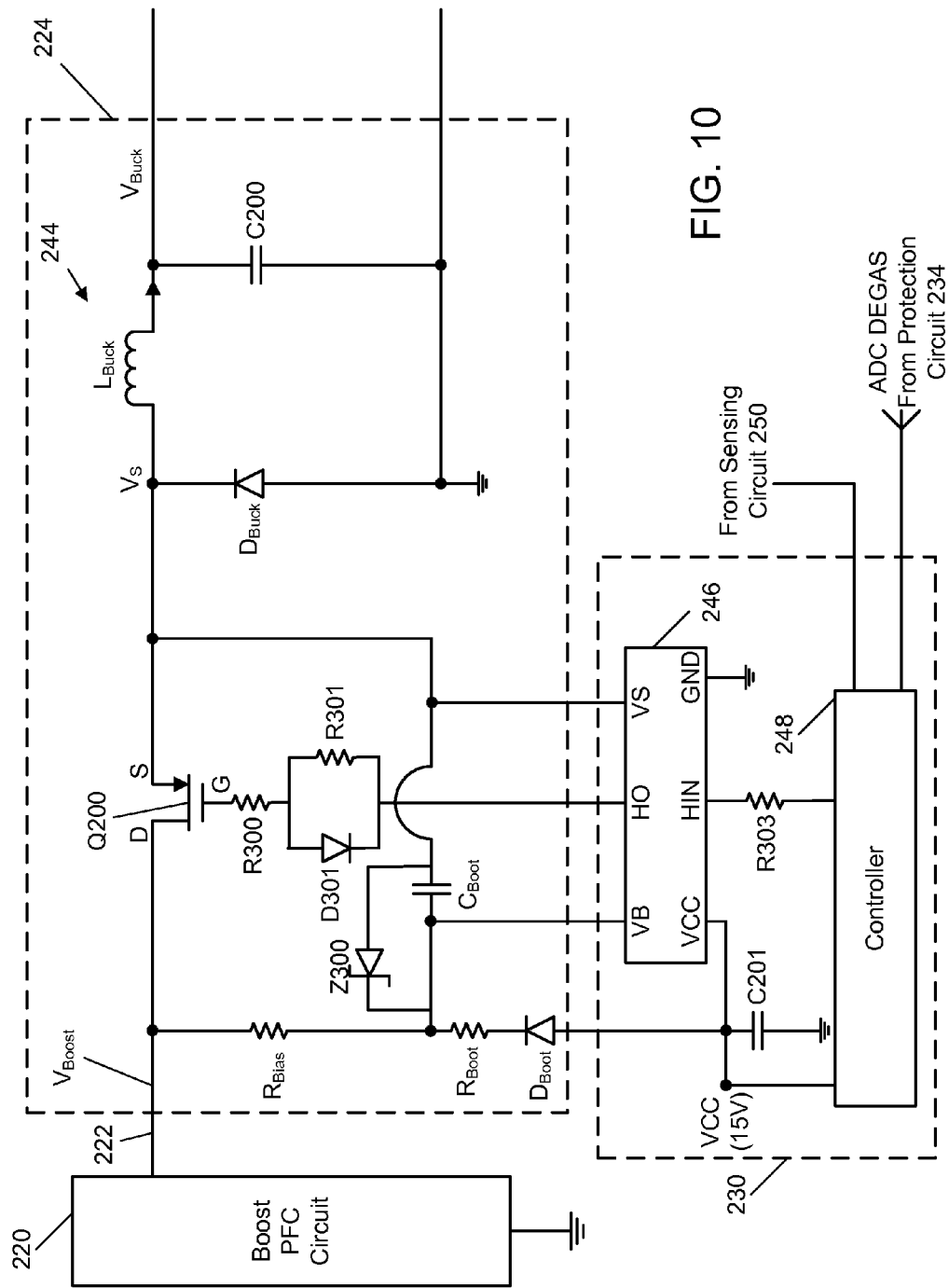
FIG. 10 shows a circuit diagram of a buck converter and a control circuit of the ballast of FIG. 8 according to embodiments disclosed herein.

FIG. 10 is a schematic of the buck converter 224 and the control circuit 230 of FIG. 8. In some embodiments, such as but not limited to during the normal operating mode, the buck converter 224 operates as a switched-mode power supply that has a duty cycle that determines the magnitude of the DC voltage signal ($V_{Buck}$) that is produced by the buck converter 224 from the high DC voltage fixed magnitude signal ($V_{Boost}$) received by the buck converter 224. The control circuit 230 drives the buck converter 224, and thus controls the duty cycle, as well as controlling activation and deactivation of the inverter 226. In FIG. 10, the control circuit 230 includes a buck driver 246 (e.g., part FAN7382 High- and Low-Side Gate Driver available from Fairchild Semiconductor) and a controller 248 (e.g., microprocessor). The controller 248 generates a control signal indicative of a switching operation for the buck converter 224, and provides the control signal to the buck driver 246. The buck driver 246, in turn, drives the switching operation of the buck converter 224 according to the control signal.

Referring to FIG. 10, as generally known, the buck converter 224 includes a first switch, a second switch, an inductor, and a capacitor. In accordance therewith, the illustrated buck converter 224 includes a metal-oxide-semiconductor field-effect transistor (buck MOSFET) Q200, a buck diode $D_{BUCK}$, a buck inductor $L_{BUCK}$, and a buck capacitor C200. The buck MOSFET Q200 has a drain terminal, a gate terminal, and a source terminal. A gate drive circuit formed by a resistor R300, a diode 301, and a resistor R301 is connected to the gate terminal of the buck MOSFET Q200 for driving the gate terminal. A bootstrapping circuit (i.e., a bootstrapping capacitor $C_{BOOT}$, a bootstrapping diode $D_{BOOT}$, and a bootstrapping resistor $R_{BOOT}$) is connected between the source terminal of the buck MOSFET Q200 and the power supply $V_{CC}$ for providing a sufficient gate to source voltage for the buck MOSFET Q200. In particular, the bootstrapping diode $D_{BOOT}$ has an anode connected to the power supply $V_{CC}$ and a cathode connected to a first terminal of the bootstrapping resistor $R_{BOOT}$ so that the bootstrapping diode $D_{BOOT}$ and the bootstrapping resistor $R_{BOOT}$ are connected together in series. A second terminal of the bootstrapping resistor $R_{BOOT}$ is connected to a first terminal of the bootstrapping capacitor $C_{BOOT}$, and a second terminal of the bootstrapping capacitor $C_{BOOT}$ is connected to the source terminal of the buck MOSFET Q200. Thus, the bootstrapping capacitor $C_{BOOT}$ is charged from the power supply $V_{CC}$ via the bootstrapping resistor $R_{BOOT}$ and the bootstrapping diode $D_{BOOT}$ when the voltage at a source terminal $V_S$ is less than the power supply voltage $V_{CC}$. In some embodiments, the first terminal of the bootstrapping capacitor $C_{BOOT}$ is also connected to the first terminal of the buck converter 224 via a resistor $R_{BIAS}$ so that the bootstrapping capacitor $C_{BOOT}$ can derive a charging current from $V_{Boost}$. In some embodiments, a zener diode Z300 is connected in parallel with the bootstrapping capacitor $C_{BOOT}$.

During normal operating mode, the MOSFET Q200 and the buck diode $D_{BUCK}$ operate so as to alternately connect and disconnect the buck inductor $L_{BUCK}$ to the boost PFC circuit 220. In other words, the buck inductor $L_{BUCK}$ alternately receives the high DC voltage ($V_{Boost}$) from the boost PFC circuit 220 as a function of the buck MOSFET Q200 and the buck diode $D_{BUCK}$. When the buck MOSFET Q200 is conductive (e.g., closed; ON), current flows from the boost PFC circuit 220 through the buck inductor $L_{BUCK}$, the buck capacitor C200, and a shunt resistor (not shown). The high DC voltage ($V_{Boost}$) from the boost PFC circuit 220 reverse-biases the buck diode $D_{BUCK}$, so no current flows through the buck diode $D_{BUCK}$. On the other hand, when the buck MOSFET Q200 is non-conductive (e.g., open; OFF), the buck diode $D_{BUCK}$ is forward biased and thus conducts current. Accordingly, current flows in a path from the buck inductor $L_{BUCK}$ and passing through the buck capacitor $C_{BUCK}$, the shunt resistor (not shown), and the buck diode $D_{BUCK}$. Thus, the buck inductor $L_{BUCK}$ stores energy (e.g., charges) from the boost PFC circuit 220 while the buck MOSFET Q200 is conductive and dissipates energy (e.g., discharges) to the inverter 226 while the buck MOSFET Q200 is non-conductive. The amount of time that the buck MOSFET Q200 is conductive during a period of one conductive and one non-conductive state (i.e., during a period) is the duty cycle for the buck converter 224. When the buck MOSFET Q200 is operating in the non-conductive state, the voltage at the source terminal $V_S$ is close to ground potential, enabling the bootstrapping capacitor $C_{BOOT}$ to charge. The bootstrapping capacitor $C_{BOOT}$ discharges energy for providing a sufficient gate to source voltage for the buck MOSFET Q200 in order to switch the buck MOSFET Q200 from the non-conductive state to the conductive state.

During the start up operating mode, the switching component operates in a non-conductive state because the voltage at the input terminal of the switching component has not yet reached the breakover voltage. As such, the inverter 226 does not operate as a load on the buck converter 224, so the buck MOSFET Q200 operates in the non-conductive state and current through the inductor $L_{BUCK}$ is low. This results in small inductive kickback so the voltage $V_S$ at the source terminal of the buck MOSFET Q200 is high (i.e., greater than $V_{CC}$). Because the voltage $V_S$ at the source terminal of the buck MOSFET Q200 is high, the bootstrapping capacitor $C_{BOOT}$ is not charged from the power supply $V_{CC}$. Additionally, when current through the resistor $R_{BIAS}$ falls below a threshold value, the bootstrapping capacitor $C_{BOOT}$ does not derive a charging current from $V_{Boost}$.

In order to ensure that the bootstrapping capacitor $C_{BOOT}$ charges and the voltage at the input terminal of the switching component increases to the breakover voltage, embodiments pulse the buck MOSFET Q200 from the non-conductive state to the conductive state ("pulsed ON") during the start up operating mode. In some embodiments, the buck MOSFET Q200 is initially pulsed (e.g., pulsed at a beginning time of the start up operating mode) on to ensure that the buck output voltage $V_{Buck}$ rises to the peak DC buck voltage value and that the bootstrapping capacitor $C_{BOOT}$ charges. Since the inverter 226 is not operating as a load on the buck converter 224, after the initial pulse(s) the bootstrapping capacitor $C_{BOOT}$ dissipates and the buck output voltage $V_{Buck}$ begins to fall (i.e., decrease). Thus, during the start up operating mode, at one or more points in time subsequent to the time of the initial pulse, the buck MOSFET Q200 is again pulsed on so that the buck output voltage $V_{Buck}$ rises back to the peak DC buck voltage value and the bootstrapping capacitor $C_{BOOT}$ recharges. In some embodiments, the time that the buck MOSFET Q200 is pulsed on may be based on the voltage value at the input of the switching circuit 252. For example, in FIGS. 3 and 4, the sensing circuit 250 senses the voltage at the input terminal of the switching circuit 252. The controller 248 monitors this sensed voltage. When the sensed voltage reaches a predetermined value(s) (i.e., less than the breakover voltage), the controller 248 provides a pulse to the gate drive of the buck converter driver 246 so that the buck MOSFET Q200 is pulsed on. Once the voltage at the input terminal of the switching circuit 252 reaches the breakover voltage, the switching circuit 252 conducts a start up signal to the inverter 226 and the inverter 226 begins oscillating and operates as a load to the buck converter 224.

In some embodiments, the controller 248 receives the ADC DEGAS signal from the protection circuit 234. This signal is representative of a change in a voltage associated with the lamp 206, and thus indicates to the controller 248 that the lamp 206 has either not yet ignited or is broken (i.e., is in a degas condition). Upon detecting a rise in the ADC DEGAS signal beyond a threshold level, the controller 248, in response, stops sending the pulse to the gate drive of the buck converter driver 246, which results in the buck MOSFET Q200 being turned off. As the buck MOSFET Q200 is turned off, the DC voltage $V_{Buck}$ is no longer provided to the inverter 226, which also shuts down (i.e., is deactivated). The controller 248 waits a predetermined period of time and then restarts the pulses to the gate drive of the buck converter driver 246, which results in the buck MOSFET Q200 being turned on again. As the buck MOSFET Q200 is turned on, the buck converter 224 begins to provide the DC voltage $V_{Buck}$ to the inverter 226, which also turns back on (i.e., is (re)activated). The (re)activation of the inverter 226 causes it to send an ignition pulse to the lamp 206. This process repeats until the lamp 206 ignites, or until the controller 248 has repeated its operations a predetermined number of times, at which point, the controller 248 no longer sends any pulses to the gate drive of the buck converter driver 246 and the ballast 200 shuts down entirely and must be re-started.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A multi-strike ballast to ignite an electrodless lamp, the multi-strike ballast comprising:
    an inverter circuit configured to send an ignition pulse to the electrodeless lamp following activation of the inverter circuit, to shut down upon receiving a deactivation signal, and to activate upon receiving an activation signal;
    a protection circuit configured to sense a change in voltage associated with the electrodeless lamp;
    a controller, wherein the controller is configured to receive the sensed change in voltage associated with the electrodeless lamp from the protection circuit and in response to send a deactivation signal to the inverter circuit, to wait a predetermined time, following the predetermined time to send an activation signal to the inverter circuit, and to repeat until the protection circuit does not sense a change in voltage associated with the electrodeless lamp or until a predefined number of repeats occur; and
    a buck converter, wherein the buck converter is configured to receive the activation signal and the deactivation signal from the controller, such that the buck converter controls activation and shut down of the inverter circuit based on the signal received from the controller.

2. The multi-strike ballast of claim 1, wherein the protection circuit comprises:
    a first zener diode and a second zener diode, each including an anode and a cathode, wherein the cathode of the first zener diode is connected to the cathode of the second zener diode, and wherein the anode of the first zener diode is connected to the inverter circuit;
    a capacitor connected to a cathode of a first rectifier diode;
    a resistor connected in parallel with the capacitor and the first rectifier diode;
    a first resistor connected in a series to a second resistor, wherein the second resistor is connected in series to a second rectifier diode, wherein the series connected first resistor, second resistor, and second rectifier diode are in parallel with the first rectifier diode; and
    a filter capacitor in parallel with the first resistor.

3. The multi-strike ballast of claim 2, wherein the protection circuit is connected to the controller at a connection point between the first resistor and the second resistor.

4. The multi-strike ballast of claim 3, wherein the controller includes an ADC DEGAS pin, and wherein the protection circuit is connected to the controller at the ADC DEGAS pin.

5. The multi-strike ballast of claim 1, wherein the protection circuit is configured to sense a change in voltage associated with the electrodeless lamp, wherein the change in voltage is due to a broken electrodeless lamp or an electrodeless lamp that has not yet ignited.

6. A method of igniting an electrodeless lamp, comprising:
    sensing a change in voltage associated with the electrodeless lamp, the electrodeless lamp having received a first ignition pulse from an activated inverter circuit;
    receiving the sensed change in voltage;
    in response, deactivating the inverter circuit;

waiting a predetermined time;
in response, reactivating the inverter circuit; and
sending a second ignition pulse to the electrodeless lamp;
wherein sensing is performed by a protection circuit, wherein the protection circuit comprises:
a first zener diode and a second zener diode, each including an anode and a cathode, wherein the cathode of the first zener diode is connected to the cathode of the second zener diode, and wherein the anode of the first zener diode is connected to the inverter circuit;
a capacitor connected to a cathode of a first rectifier diode;
a resistor connected in parallel with the capacitor and the first rectifier diode;
a first resistor connected in a series to a second resistor, wherein the second resistor is connected in series to a second rectifier diode, wherein the series connected first resistor, second resistor, and second rectifier diode are in parallel with the first rectifier diode; and
a filter capacitor in parallel with the first resistor.

7. The method of claim 6, further comprising:
repeating the steps of sensing, receiving, deactivating, waiting, reactivating, and sending, until the electrodeless lamp ignites.

8. The method of claim 6, further comprising:
repeating the steps of sensing, receiving, deactivating, waiting, reactivating, and sending, until a predetermined number of repeats occurs.

\* \* \* \* \*